US012795636B2

(12) United States Patent
Zhang et al.

(10) Patent No.: US 12,795,636 B2
(45) Date of Patent: Nov. 10, 2026

(54) METHODS, DEVICES, AND COMPUTER READABLE MEDIUM FOR COMMUNICATION

(71) Applicant: NEC CORPORATION, Tokyo (JP)

(72) Inventors: Xiaohong Zhang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 345 days.

(21) Appl. No.: 18/681,785

(22) PCT Filed: Aug. 17, 2021

(86) PCT No.: PCT/CN2021/113076
§ 371 (c)(1),
(2) Date: Feb. 6, 2024

(87) PCT Pub. No.: WO2023/019439
PCT Pub. Date: Feb. 23, 2023

(65) Prior Publication Data
US 2024/0349266 A1 Oct. 17, 2024

(51) Int. Cl.
*H04W 72/11* (2023.01)
*H04L 1/1867* (2023.01)
*H04W 72/232* (2023.01)

(52) U.S. Cl.
CPC ........... *H04W 72/11* (2023.01); *H04L 1/1887* (2013.01); *H04W 72/232* (2023.01)

(58) Field of Classification Search
CPC ... H04W 72/11; H04W 72/232; H04L 1/1887; H04L 1/1896; H04L 1/1854
See application file for complete search history.

(56) References Cited

U.S. PATENT DOCUMENTS

2020/0389873 A1* 12/2020 Liu ........................ H04W 72/12
2021/0226759 A1 7/2021 Takeda et al.
(Continued)

FOREIGN PATENT DOCUMENTS

CN 110719150 A 1/2020
CN 111865506 A 10/2020
CN 112787772 A 5/2021

OTHER PUBLICATIONS

International Search Report for PCT/CN2021/113076 dated May 18, 2022 (PCT/ISA/210).
(Continued)

*Primary Examiner* — Ashley Shivers
(74) *Attorney, Agent, or Firm* — Sughrue Mion, PLLC

(57) ABSTRACT

According to embodiments of the present disclosure, a solution for supporting repetitions for a plurality of downlink data transmission scheduled by signal downlink control information is proposed. A terminal device receives downlink control information (DCI) scheduling a plurality of downlink data transmissions with repetitions from a network device. The terminal device determines a hybrid automatic repeat request (HARQ)-ACK codebook for the plurality of downlink data transmissions based on a repetition pattern for the plurality of downlink data transmissions and the slot offset. The terminal device transmits a feedback for the repetitions for the downlink data transmissions based on the HARQ-ACK codebook to the network device. In this way, it achieves a flexible repetition patterns for the plurality of downlink data transmissions scheduled by signal DCI, which improves the coverage/reliability performance for data transmission.

14 Claims, 18 Drawing Sheets

(56) References Cited

U.S. PATENT DOCUMENTS

| | | | | |
|---|---|---|---|---|
| 2022/0399978 | A1* | 12/2022 | Gao | H04L 1/1854 |
| 2023/0239077 | A1* | 7/2023 | Gerami | H04W 72/1273<br>370/329 |
| 2024/0064768 | A1* | 2/2024 | Matsumura | H04W 72/232 |

OTHER PUBLICATIONS

Written Opinion for PCT/CN2021/113076 dated May 18, 2022 (PCT/ISA/237).

* cited by examiner

METHODS, DEVICES, AND COMPUTER READABLE MEDIUM FOR COMMUNICATION

CROSS REFERENCE TO RELATED APPLICATIONS

This application is a National Stage of International Application No. PCT/CN2021/113076 filed Aug. 17, 2021.

TECHNICAL FIELD

Embodiments of the present disclosure generally relate to the field of telecommunication, and in particular, to methods, devices, and computer readable medium for communication.

BACKGROUND

Several technologies have been proposed to improve communication performances. For example, semi-persistent scheduling physical downlink shared channel (SPS PDSCH) and configured grant physical uplink shared channel (CG PUSCH) have been introduced. Further, a terminal device can transmit a feedback for the downlink data transmission. Moreover, a position for transmitting the feedback is also a key aspect.

SUMMARY

In general, example embodiments of the present disclosure provide a solution for communication.

In a first aspect, there is provided a method for communication. The communication method comprises: receiving, at a terminal device and from a network device, control information indicating a pattern of a set of semi-persistent scheduling physical downlink shared channel (SPS PDSCH) occasions for data transmission per periodicity of a transmission configuration; in accordance with a determination that the data transmission is received on the set of SPS PDSCH occasions, determining a control channel for transmitting hybrid automatic repeat request, HARQ, feedback information associated with the data transmission; and transmitting the HARQ feedback information on the control channel to the network device.

In a second aspect, there is provided a method for communication. The communication method comprises receiving, at a terminal device and from a network device, control information indicating a number of code block groups (CBGs) for a semi-persistent scheduling data channel per periodicity of a semi-persistent scheduling configuration.

In a third aspect, there is provided a terminal device. The terminal device comprises a processing unit; and a memory coupled to the processing unit and storing instructions thereon, the instructions, when executed by the processing unit, causing the terminal device to perform acts comprising: receiving, at a terminal device and from a network device, control information indicating a pattern of a set of semi-persistent scheduling physical downlink shared channel (SPS PDSCH) occasions for data transmission per periodicity of a transmission configuration; in accordance with a determination that the data transmission is received on the set of SPS PDSCH occasions, determining a control channel for transmitting hybrid automatic repeat request, HARQ, feedback information associated with the data transmission; and transmitting the HARQ feedback information on the control channel to the network device.

In a fourth aspect, there is provided a terminal device. The terminal device comprises a processing unit; and a memory coupled to the processing unit and storing instructions thereon, the instructions, when executed by the processing unit, causing the terminal device to perform acts comprising: receiving, at a terminal device and from a network device, control information indicating a number of code block groups (CBGs) for a semi-persistent scheduling data channel per periodicity of a semi-persistent scheduling configuration.

In a fifth aspect, there is provided a computer readable medium having instructions stored thereon, the instructions, when executed on at least one processor, causing the at least one processor to carry out the method according to any one of the first aspect or second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
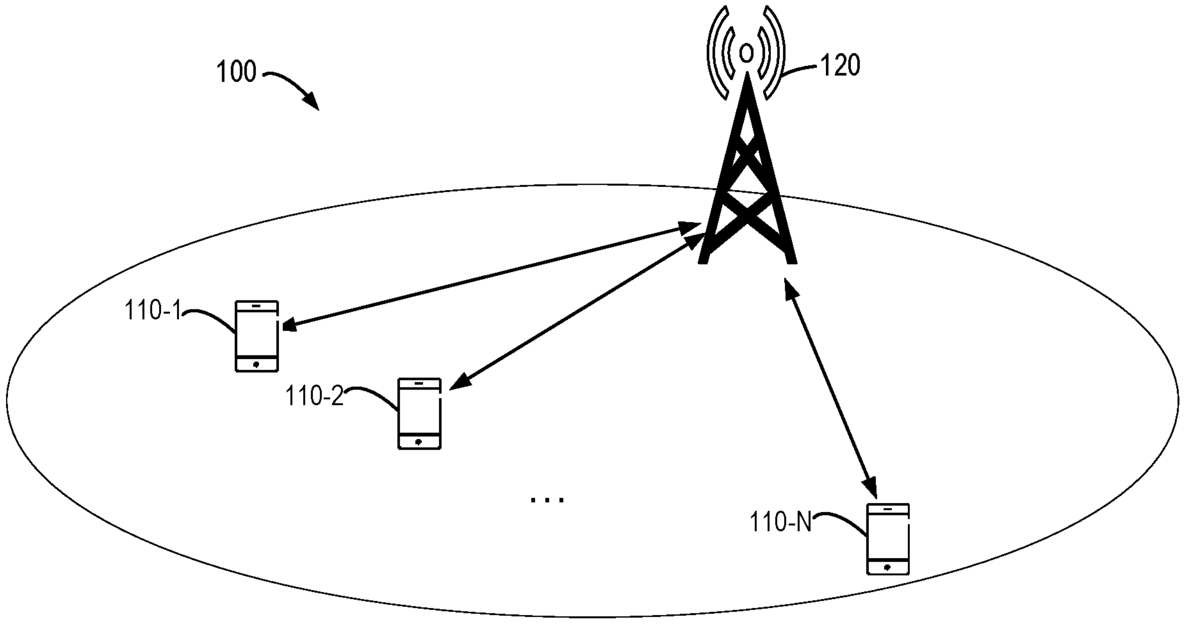
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.85G, the third generation (3G), the fourth generation (4G), 4.5G, the fifth generation (5G), and the sixth (6G) communication protocols. The techniques described herein may be used for the wireless networks and radio technologies mentioned above as well as other wireless networks and radio technologies.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, SPS PDSCH and CG PUSCH transmissions have been proposed. Enhancements on SPS PDSCH/CG PUSCH for Virtual Reality (VR) and Augmented Reality (AR) (can be collectively referred to as "XR") traffics are needed. The characters of XR traffic are simple summarized as following: high throughput (10 Mbps~50 Mbps), high reliability (99%~99.999%), low latency (PDB=10 ms~60 ms), periodicity. The term "semi persistent scheduling (SPS)" used herein can refer to a mechanism in which the PDSCH transmission is scheduled by RRC message.

SPS PDSCH/CG PUSCH can be used small periodic data packet transmission. A UE can be configured at most one SPS configuration/CG configuration, the minimum period is 10 ms. Code block group (CBG) based transmission for SPS PDSCH/CG PUSCH is not supported. Furthermore, enhancements on SPS/CG for ultra-reliability low latency communication (URLLC) traffic (small data packet) were introduced. Multiple SPS/CG configurations can be configured for a UE for different URLLC services and latency reduction. The minimum period of SPS/CG is 1 slot. Separate release/activation and joint release for multiple SPS/CG configurations are supported.

However, for XR traffic, which may have large packet size (e.g., if the average source data rate e.g. equals 45 Mbps with 60 fps, the average payload size per frame equals 750 kbits), it is hard for UE to transmit such large packet size in one TB. Though this issue can be solved by activating multiple SPS/CG configurations simultaneously for UE, it may result in large RRC configuration overhead and multiple activation DCIs transmission.

Considering that multi-TB scheduling has been introduced in Rel-17, another reasonable solution proposed by some companies is to support multi-TB transmission per SPS/CG periodicity in Rel-18. In addition, for Rel-15/Rel-16 SPS/CG with small data packet size, it is not necessary to support CBG based transmission, but for large periodic XR data packet size, it is beneficial to support CBG based transmission for SPS/CG to improve the spectrum efficiency (SE). So the following enhancements of SPS/CG transmission for XR traffic can be further studied, i.e., multi-TB transmission per SPS/CG periodicity and CBG based transmission for SPS/CG transmissions.

The information element (IE) SPS-Config is used to configure downlink semi-persistent transmission. Multiple Downlink SPS configurations may be configured in one BWP of a serving cell. The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

However, if multi-TB transmission per SPS/CG periodicity for XR is supported, following issues need to be solved: (1) how to configure/indicate multiple TBs per SPS/CG periodicity; (2) whether support repetition for multiple TBs per SPS/CG periodicity, if support, how to design the repetition pattern; and (3) whether current HARQ-ACK feedback mechanism can be reused for multiple transport blocks (TBs) per SPS/CG periodicity. Moreover, if CBG based transmission for SPS PDSCH/CG PUSCH is supported for XR, it needs further study on how to configure the number of CBG for a SPS PDSCH/CG PUSCH transmission for UE. Further, HARQ-ACK codebook construction for CBG based SPS PDSCH transmission needs to be studied.

According to embodiments, solutions on SPS PDSCH/CG PUSCH are proposed. A terminal device receives, from a network device, control information indicating a pattern of a set of SPS PDSCH occasions for data transmission per periodicity of a transmission configuration. If the data transmission is received on the set of SPS PDSCH occasions, the terminal device determines a control channel for transmitting hybrid automatic repeat request, HARQ, feedback information associated with the data transmission. The terminal device transmits the HARQ feedback information on the control channel to the network device. In this way, it enables HARQ feedback for SPS PDSCH/CG PUSCH.

FIG. 1 illustrates a schematic diagram of a communication system in which embodiments of the present disclosure can be implemented. The communication system 100, which is a part of a communication network, comprises a terminal device 110-1, a terminal device 110-2, . . . , a terminal device 110-N, which can be collectively referred to as "terminal device(s) 110." The number N can be any suitable integer number.

The communication system 100 further comprises network terminal device 120-1, a network device 120-2, . . . , a network device 120-M, which can be collectively referred to as "network device(s) 120." In some embodiments, the network device may be gNB. Alternatively, the network device may be IAB. The number M can be any suitable integer number. In the communication system 100, the network devices 120 and the terminal devices 110 can communicate data and control information to each other. Only for the purpose of illustrations, the network device 120-1 can be regarded as a source network device and the network device 120-2 can be regarded as a target network device. The numbers of terminal devices and network devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Embodiments of the present disclosure can be applied to any suitable scenarios. For example, embodiments of the present disclosure can be implemented at reduced capability NR devices. Alternatively, embodiments of the present disclosure can be implemented in one of the followings: NR multiple-input and multiple-output (MIMO), NR sidelink enhancements, NR systems with frequency above 52.6 GHz, an extending NR operation up to 71 GHz, narrow band-Internet of Thing (NB-IoT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

The term "slot" used herein refers to a dynamic scheduling unit. One slot comprises a predetermined number of symbols. The term "downlink (DL) sub-slot" may refer to a virtual sub-slot constructed based on uplink (UL) sub-slot. The DL sub-slot may comprise fewer symbols than one DL slot. The slot used herein may refer to a normal slot which comprises a predetermined number of symbols and also refer to a sub-slot which comprises fewer symbols than the predetermined number of symbols.

Figure 2:
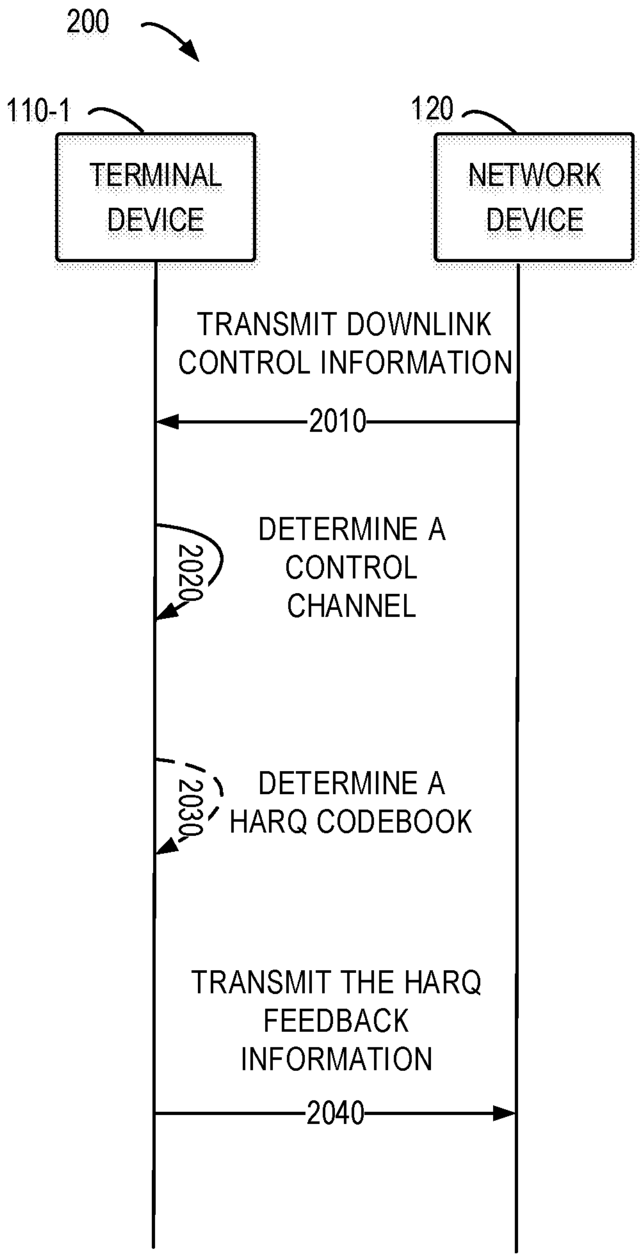
FIG. 2 illustrates a signaling flow for communications according to some embodiments of the present disclosure.

Embodiments of the present disclosure will be described in detail below. Reference is first made to FIG. 2, which shows a signaling chart illustrating process 200 among network devices according to some example embodiments of the present disclosure. Only for the purpose of discussion, the process 200 will be described with reference to FIG. 1. The process 200 may involve the terminal device 110-1 and the network device 120 in FIG. 1.

The network device 120 transmits 2010 control information to the terminal device 110-1. The control information indicates a pattern of a set of SPS PDSCH occasions for data transmission per periodicity of a transmission configuration. Alternatively or in addition, the control information can indicate a pattern of a set of CG PUSCH occasions for data transmission per periodicity of the transmission configuration. Only for the purpose of illustrations, embodiments of the present disclosure are described with the reference to SPS PDSCH. In one embodiment, the network device 120 may transmit 2010 configuration information to the terminal device 110-1. The configuration information comprises a configuration of a set of SPS PDSCH occasions for data transmission per periodicity of a transmission configuration. The configuration may explicitly or implicitly correspond to the pattern.

The pattern can comprise the number of the set of SPS PDSCH occasions. Alternatively or in addition, the pattern can comprise a time domain location and/or a frequency domain location of the set of SPS PDSCH occasions. In other embodiments, the pattern can comprise the number of the set of CG PUSCH occasions. Alternatively or in addition, the pattern can comprise a time domain location and/or a frequency domain location of the set of CG PUSCH occasions.

In some embodiments, the control information can be transmitted in a higher layer configuration. For example, a RRC parameter can be used to configure the number of transmission occasions per SPS/CG periodicity for each SPS configuration/CG configuration. In other words, the control information can be transmitted in the RRC configuration. For example, if M transmission occasions per SPS periodicity are configured, when the SPS configuration is activated, M SPS PDSCHs with same time domain resource allocation will be transmitted in M continues slots/mini-slots on a component carrier (CC). The SPS configuration may be activated via a MAC layer or physical layer signaling. Carrier aggregation is a technique that is used in wireless communication to increase the data rate per user, whereby multiple frequency blocks (called component carriers) are assigned to the same user.

Alternatively, the control information can be transmitted in downlink control information (DCI). The DCI is for activating or updating the SPS/CG configuration. In some embodiments, a new field can be introduced in DCI to explicitly indicate the number of TBs per SPS/CG periodicity for the corresponding activated SPS configuration/CG configuration. For example, RRC signaling can configure a set of the number of TBs per SPS/CG periodicity {2, 4, 6, 8}, 2-bit in DCI is used to indicated one value M from the set, when the SPS configuration is activated, M SPS PDSCHs with same time domain resource allocation will be transmitted in M continues slots/mini-slots.

For multiple time division multiplex (TDM)-based TBs per SPS periodicity, the DCI may implicitly indicate the number of TBs per SPS/CG periodicity by the number of start and length indicator values (SLIVs) in the indicated row index in the configured time domain resource allocation (TDRA) table. For example, if the activation DCI indicates a row index with two SLIVs in the TDRA table for SPS PDSCH transmission, the terminal device 110-1 may transmit two SPS PDSCHs within a periodicity based on the time domain resource allocation.

In other embodiments, the terminal device 110-1 may receive a RRC configuration which comprises the control information. The control information may indicate a plurality of patterns of the set of SPS PDSCH occasions. The terminal device 110-1 may receive the DCI which comprises an indication of a target pattern. The terminal device 110-1 may determine the target pattern from the plurality of patterns based on the indication. For example, several patterns for multiple SPS PDSCH occasions per SPS periodicity for a SPS configuration can be configured by RRC signaling, one of the patterns can be indicated for UE by activation DCI. Then terminal device 110-1 can determine the number of SPS PDSCH occasions for multi-TB transmissions per SPS periodicity and the corresponding slots/mini-slots based on the pattern. Alternatively, the control information may indicate a plurality of patterns of the set of CG PUSCH occasions. The terminal device 110-1 may receive the DCI which comprises an indication of a target pattern. The terminal device 110-1 may determine the target pattern from the plurality of patterns based on the indication. For example, several patterns for multiple CG PUSCH occasions per CG periodicity for a CG configuration can be configured by RRC signaling, one of the pattern can be indicated for UE by activation DCI. Then terminal device 110-1 can determine the number of CG PUSCH occasions for multi-TB transmissions per SPS periodicity and the corresponding slots/mini-slots based on the pattern.

Figure 3:
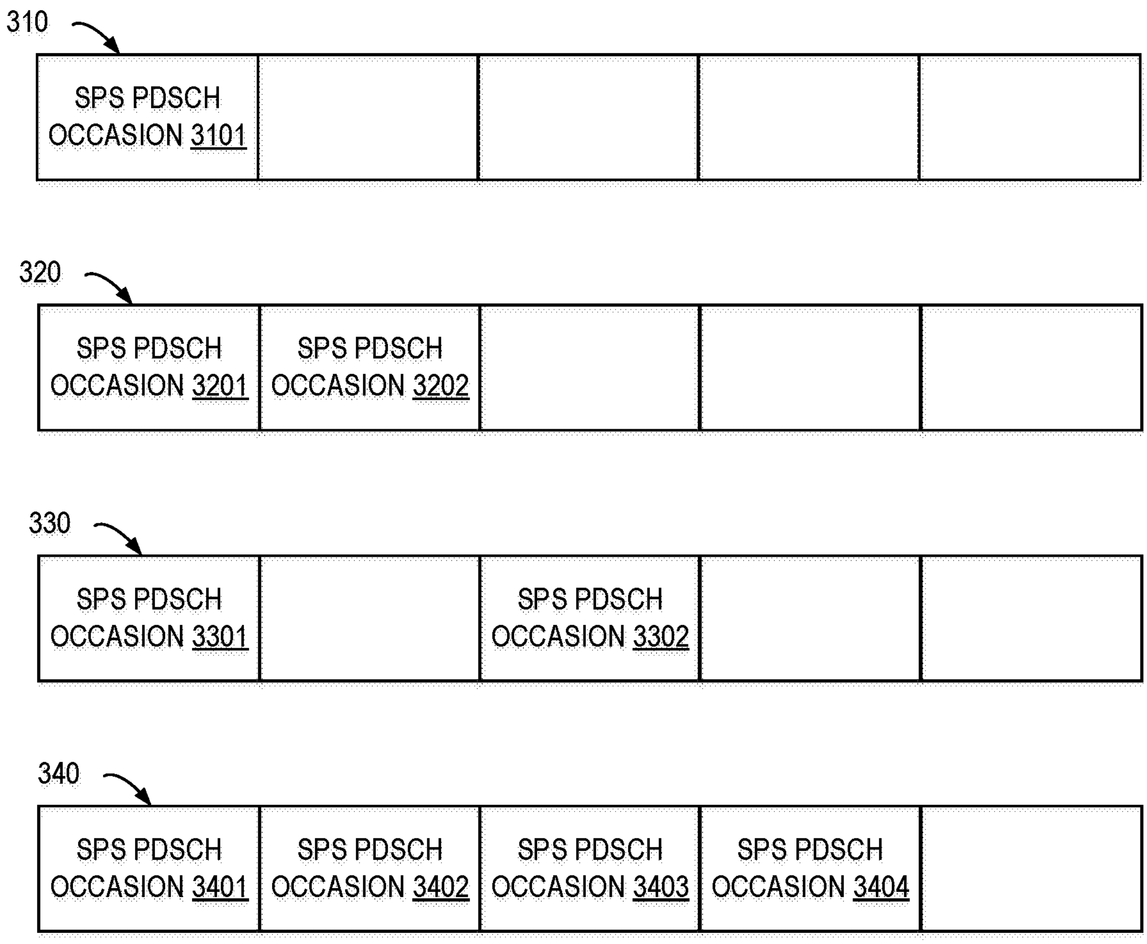
FIG. 3 illustrate a simplified block diagram of a pattern according to some embodiments of the present disclosure.

For example, for a SPS configuration with 5-slot periodicity, FIG. 3 shows several patterns which can be configured by RRC signaling. As shown in FIG. 3, the pattern 310 may comprise the SPS PDSCH occasion 310-1. The pattern 320 may comprise the SPS PDSCH occasions 3201 and 3202. The pattern 330 can comprise the SPS PDSCH occasions 3301 and 3302. The pattern 340 may comprise the SPS PDSCH occasions 3401, 3402, 3403 and 3404.

For multiple frequency division multiplex (FDM)-based TBs per SPS/CG periodicity, it means that a SPS/CG configuration can cross multiple CCs. In this case, the RRC signaling from the network device 120 can configure a table for mapping the TB index and CC index to indicate a target transmission occasion pattern for the terminal device. Alternatively, in this case, the DCI from the network device 120 can directly indicate a CC index for each transmission occasion to indicate a target pattern for the terminal device. Table 1 below shows an example of a table for mapping TB index and CC index.

TABLE 1

| TB Index | TB #1 | TB #2 |
|---|---|---|
| CC Index | CC #0 | CC #1 |

Figure 4A:
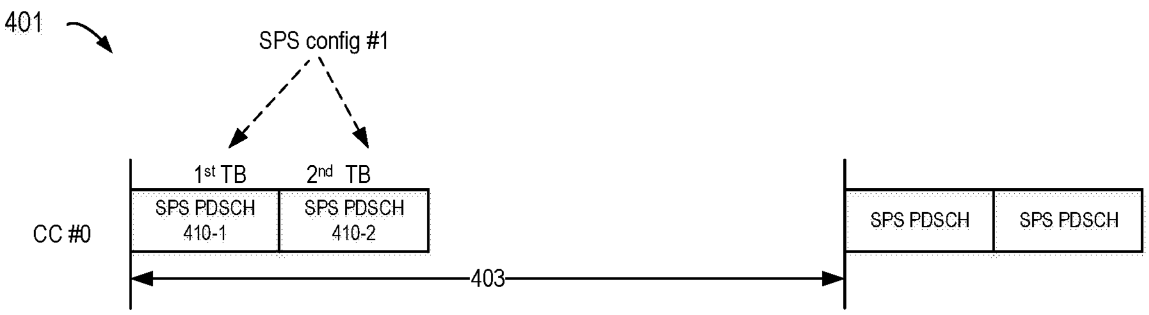
FIGS. 4A and 4B illustrate simplified block diagrams of multiple TBs per SPS periodicity according to some embodiments of the present disclosure.
Figure 4B:
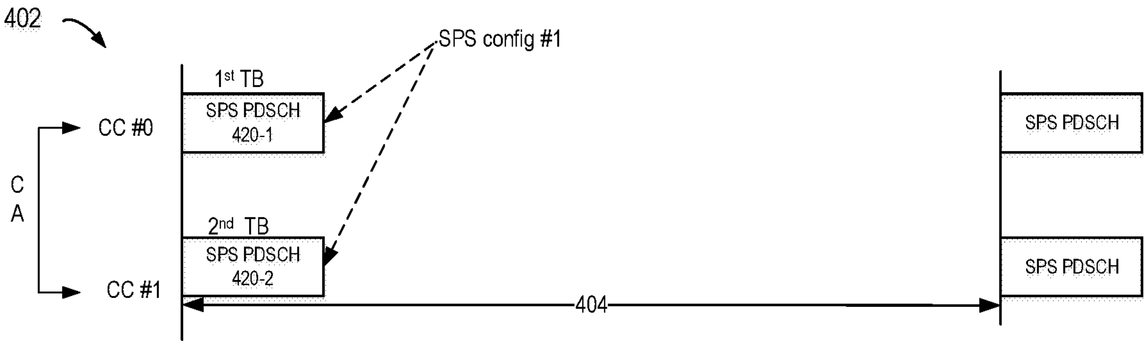

FIGS. 4A and 4B show schematic diagrams of multiple TBs per SPS periodicity. As shown in FIG. 4A, the configuration 401 can comprise multiple TDM-based TBs per SPS periodicity. For CC #0, there is a SPS PDSCH occasion 410-1 for the first TB and a SPS PDSCH occasion 410-2 for the second TB within the period 403. As shown in FIG. 4B, the configuration 402 can comprise multiple FDM-based TBs per SPS periodicity. There is a SPS PDSCH occasion

420-1 for the first TB on CC #0 and a SPS PDSCH occasion 420-2 for the second TB on CC #1 within the period 404. In this way, it designs the signaling to configure/indicate multiple TBs per SPS/CG periodicity for UE to satisfy the requirements of XR traffic, which reduces the RRC configuration signaling and the PDCCH transmissions, then the UE power is saved.

Figure 5A:
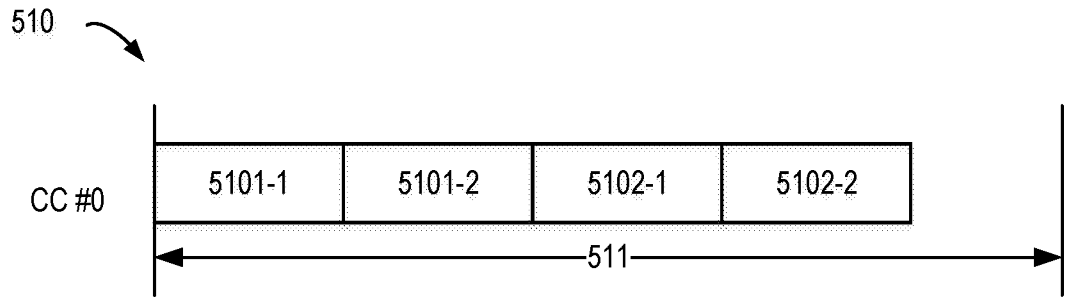
FIGS. 5A to 5E illustrate simplified block diagrams of multiple TBs per SPS periodicity according to some embodiments of the present disclosure.
Figure 5B:
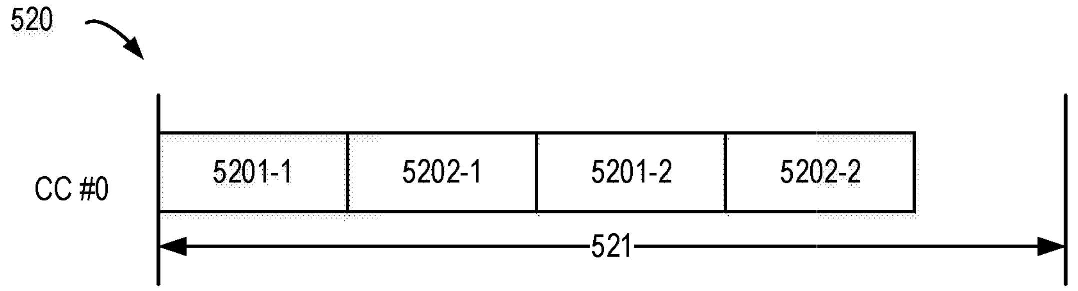
Figure 5C:
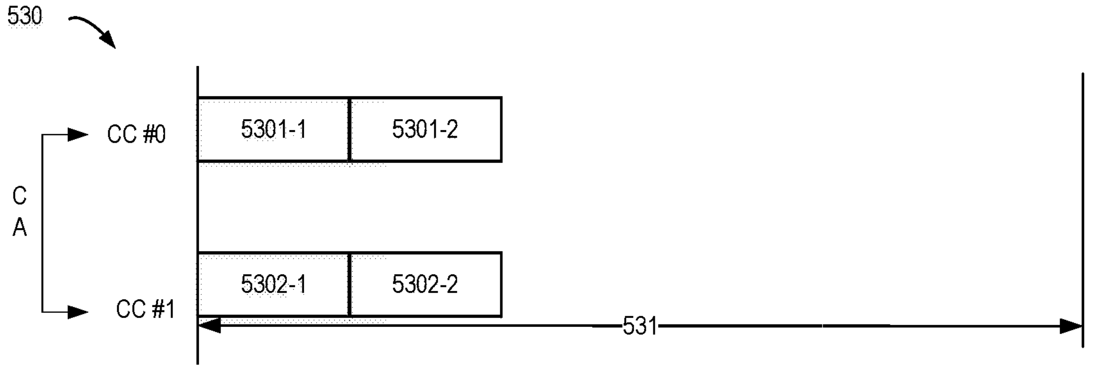
Figure 5D:
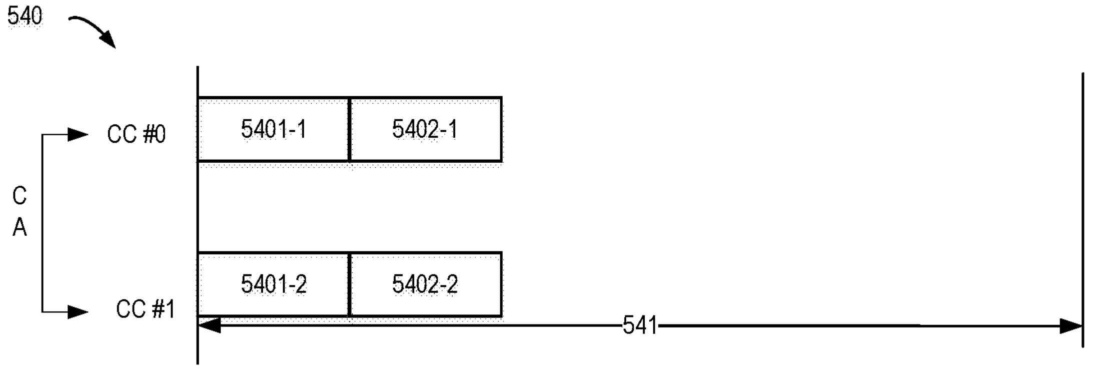
Figure 5E:
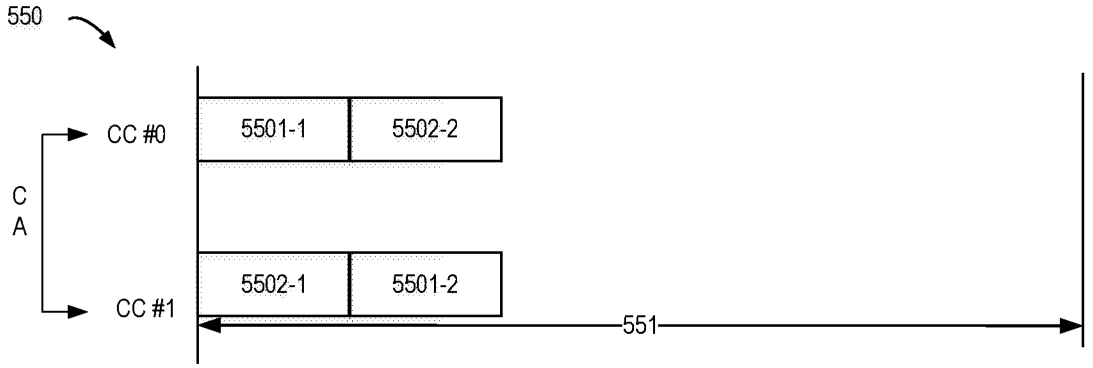

In some embodiments, the terminal device does not expect to be configured with aggregation or repetition for multiple TBs per SPS/CG periodicity. Alternatively, repetition for multiple TBs per SPS/CG periodicity can be configured for the terminal device 110-1 to improve the reliability of SPS PDSCH/CG PUSCH for XR. FIGS. 5A-5E shows schematic diagrams of repetition patterns. As shown in FIG. 5A, the repetition pattern 510 may comprise the repetition occasions 5101-1 and 5101-2 on the CC #0 for the first TB and the repetition occasions 5102-1 and 5102-2 on the CC #0 for the second TB, during the period 511. As shown in FIG. 5B, the repetition pattern 520 may comprise the repetition occasions 5201-1 and 5201-2 on the CC #0 for the first TB and the repetition occasions 5202-1 and 5202-2 on the CC #0 for the second TB, during the period 521. As shown in FIG. 5C, the repetition pattern 530 may comprise the repetition occasions 5301-1 and 5301-2 on the CC #0 for the first TB and the repetition occasions 5302-1 and 5302-2 on the CC #1 for the second TB, during the period 531. As shown in FIG. 5D, the repetition pattern 540 may comprise the repetition occasion 5401-1 on the CC #0 and repetition occasion 5401-2 on the CC #1 for the first TB and the repetition occasion 5402-1 on the CC #0 and repetition occasion and 5402-2 on the CC #1 for the second TB, during the period 541. As shown in FIG. 5E, the repetition pattern 550 may comprise the repetition occasion 5501-1 on the CC #0 and repetition occasion 5501-2 on the CC #1 for the first TB and the repetition occasion 5502-1 on the CC #0 and repetition occasion and 5502-2 on the CC #1 for the second TB, during the period 551. In addition, the network may configure one of the aggregation or repetition patterns for multiple transmission occasions per CG/SPS configuration for UE by RRC signaling or DCI indication. Some pattern may provide better combination gain, some pattern may achieve less latency, and some pattern may provide both frequency domain diversity gain and time domain diversity gain. It provides the flexibility for network to select different pattern for different cases.

If the data transmission is received on the set of SPS PDSCH occasions, the terminal device 110-1 determines 2020 a UL control channel for transmitting HARQ feedback information associated with the data transmission. In some embodiments, the terminal device 110-1 may determine the control channel based on a last transmission occasion. For example, the last transmission can be the last transmission occasion in the periodicity regardless of whether the nominal last transmission occasion collides with an uplink symbol. Alternatively, the last transmission can be an actual last transmission occasion which does not collide with the uplink symbol. In other embodiments, if multiple TBs are across multiple CCs, the last transmission can be the last transmission occasion in time domain among all SPS PDSCH occasions of a SPS configuration on the multiple CCs. Alternatively, the last SPS PDSCH reception means the last PDSCH reception in time domain on the lowest CC index/highest CC index/Pcell. In this way, a unique PUCCH resource can be determined for HARQ-ACK transmission, it is beneficial to improve the data transmission performance for some XR traffic with high reliability requirements.

Figure 6A:
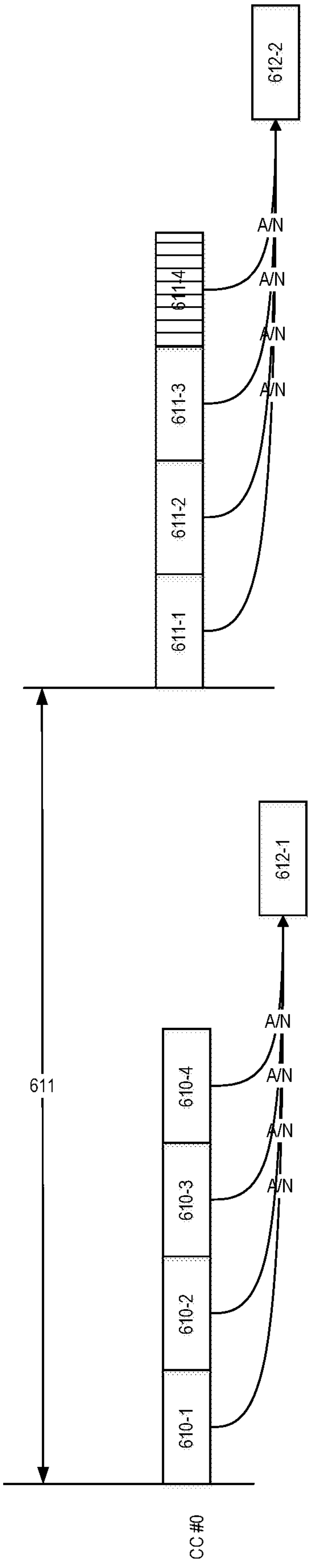
FIGS. 6A to 6C illustrate simplified block diagrams of HARQ-ACK codebooks according to some embodiments of the present disclosure.

For a SPS configuration, HARQ-ACK bits for the multiple TBs per SPS periodicity are multiplexed on a PUCCH, the slot for PUCCH resource can be determined based on the HARQ-ACK timing value k1 in activation DCI and the slot for last SPS PDSCH reception. In some embodiment, the last SPS PDSCH reception means the nominal last SPS PDSCH, e.g., for 4 SPS PDSCHs per periodicity, the last SPS PDSCH means the 4th SPS PDSCH regardless of whether the SPS PDSCH collides with the UL symbol. FIG. 6A shows slot determination for HARQ-ACK feedback transmission when M=4 and the k1 value indicated in the activation DCI is 1. As shown in FIG. 6A, HARQ-ACK bits for the SPS PDSCH receptions 610-1, 610-2, 610-3 and 610-4 in the period 611 can be multiplexed on the PUCCH 612-1. The slot for the PUCCH 612-1 can be determined based on the HARQ-ACK timing value in the DCI and the slot for the SPS PDSCH reception 610-4. HARQ-ACK bits for the SPS PDSCH receptions 611-1, 611-2, and 611-3 can be multiplexed on the PUCCH 612-2. The slot for the PUCCH 612-2 can be determined based on the HARQ-ACK timing value in the DCI and the slot for the SPS PDSCH occasion 611-4, even though the slot for SPS PDSCH occasion 611-4 is UL slot.

Figure 6B:
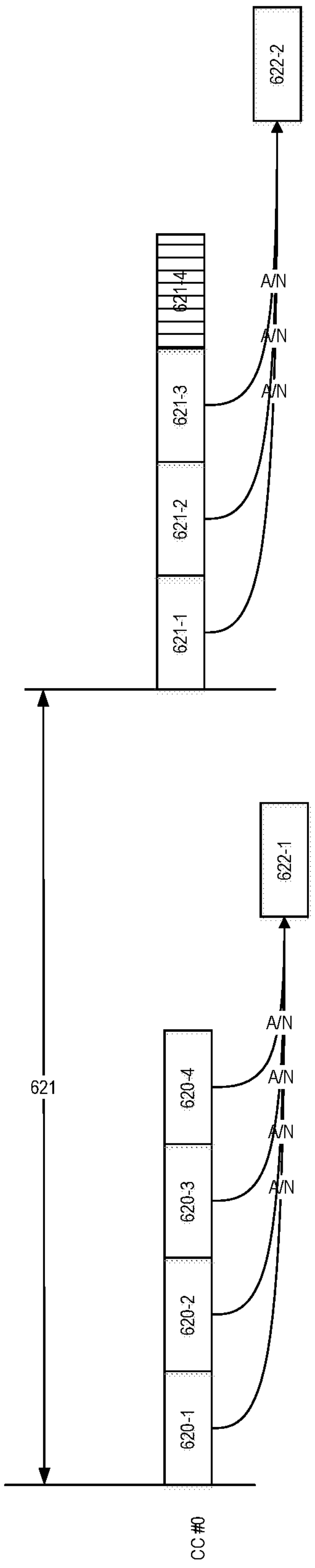

Alternatively, the last SPS PDSCH reception means the actual last SPS PDSCH, e.g., for 4 SPS PDSCHs per periodicity, the last SPS PDSCH is the 3rd SPS PDSCH if the 4th SPS PDSCH occasion collides with the UL symbol. FIG. 6B shows slot determination for HARQ-ACK feedback transmission when M=4 and the k1 value indicated in the activation DCI is 1. As shown in FIG. 6B, HARQ-ACK bits for the SPS PDSCH receptions 620-1, 620-2, 620-3 and 620-4 in the period 621 can be multiplexed on the PUCCH 622-1. The slot for the PUCCH 622-1 can be determined based on the HARQ-ACK timing value in the DCI and the slot for the SPSP PDSCH reception 620-4. HARQ-ACK bits for the SPS PDSCH receptions 621-1, 621-2, and 621-3 can be multiplexed on the PUCCH 622-2. The slot for the PUCCH 622-2 can be determined based on the HARQ-ACK timing value in the DCI and the slot for the SPS PDSCH 621-3, since the SPS PDSCH 621-3 is the actual last transmission occasion and SPS PDSCH occasion 621-4 collides with the UL symbol, thus the lower HARQ-ACK feedback latency is achieved. For multi-PDSCH scheduling, the reference last PDSCH for determining the slot for PUCCH transmission for HARQ-ACK of the multiple PDSCHs can be nominal last PDSCH or the last valid PDSCH reception not collides UL symbol.

Figure 6C:
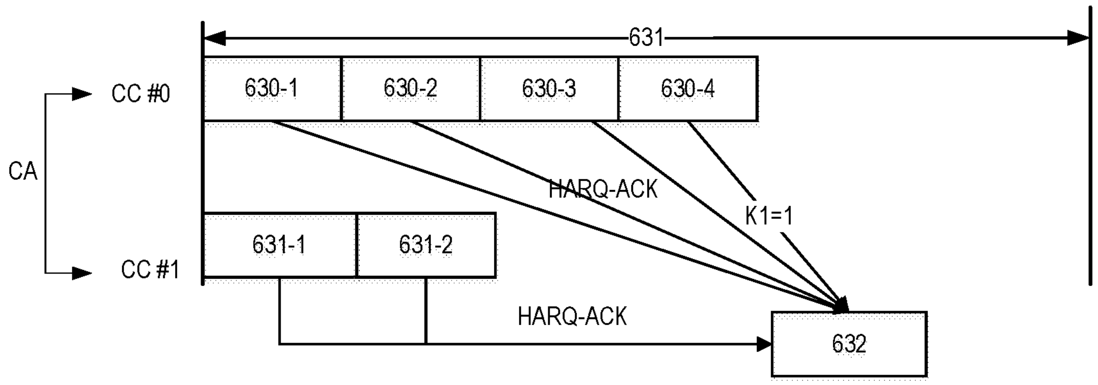

Alternatively or in addition, the last transmission can be the last transmission occasion in time domain among the set of transmission occasions on a plurality of CCs. If multiple TBs are across multiple CCs, the last SPS PDSCH reception means the last PDSCH reception in time domain among all SPS PDSCH reception occasions on the multiple CCs. FIG. 6C shows slot determination for HARQ-ACK feedback transmission when 6 TBs/SPS PDSCHs per SPS periodicity cross two CCs is configured, the k1 value indicated in the activation DCI is 1. As shown in FIG. 6C, HARQ-ACK bits for the SPS PDSCH receptions 630-1, 630-2, 630-3, 630-4, 631-1 and 631-2 in the period 631 can be multiplexed on the PUCCH 632.

In some embodiments, the terminal device 110-1 may determine 2030 a HARQ codebook. For Type-2 HARQ-ACK CB, clarification for multiple SPS PDSCHs per SPS periodicity is needed, otherwise the terminal device 110-1 may have ambiguity on the HARQ-ACK codebook size, which degrades the HARQ-ACK transmission performance. When the codebook includes HARQ-ACK for multi-PD- SCHs scheduling and HARQ-ACK for single-PDSCH scheduling, which means two sub-codebooks, the first one for single-PDSCH scheduling and the second one for multi-PDSCHs scheduling can be constructed. While for HARQ-ACK bits for multiple SPS PDSCHs per SPS periodicity multiplexed on the codebook, how to determine their corresponding HARQ-ACK locations on the codebook has not been studied yet. In this way, we propose some methods to complete the HARQ-ACK feedback mechanism for multiple TBs per SPS periodicity to make the system work well. The term "type 2 HARQ codebook" used herein can refer to a codebook has dynamic size and changes according to resource allocation.

In some embodiments, for HARQ-ACK bits for the first M SPS PDSCHs within a SPS periodicity with activation DCI, the c-downlink assignment index (DAI)/t-DAI in the activation DCI is for the second sub-codebook, the terminal device 110-1 may generate the HARQ-ACK positions for first M SPS PDSCHs on the second sub-codebook, the HARQ-ACK location in the second sub-codebook is determined based on the c-DAI/t-DAI values. Alternatively, for the M SPS PDSCHs within a SPS periodicity without activation DCI, the terminal device 110-1 may generate the HARQ-ACK positions for the M SPS PDSCHs on the first sub-codebook and place them after the HARQ-ACK bits for dynamic scheduled PDSCHs.

In other embodiments, the terminal device 110-1 may generate M HARQ-ACK positions for the M SPS PDSCHs within a SPS periodicity with/without activation DCI on the second sub-codebook. The HARQ-ACK bit order for the first M SPS PDSCHs within a SPS periodicity with activation DCI in a codebook can be based on the DAI value in activation DCI. Alternatively or in addition, the HARQ-ACK bit order for the M SPS PDSCHs within a SPS periodicity without activation DCI in a codebook can be placed after the HARQ-ACK for multi-PDSCHs scheduled by single DCI.

Figure 7:
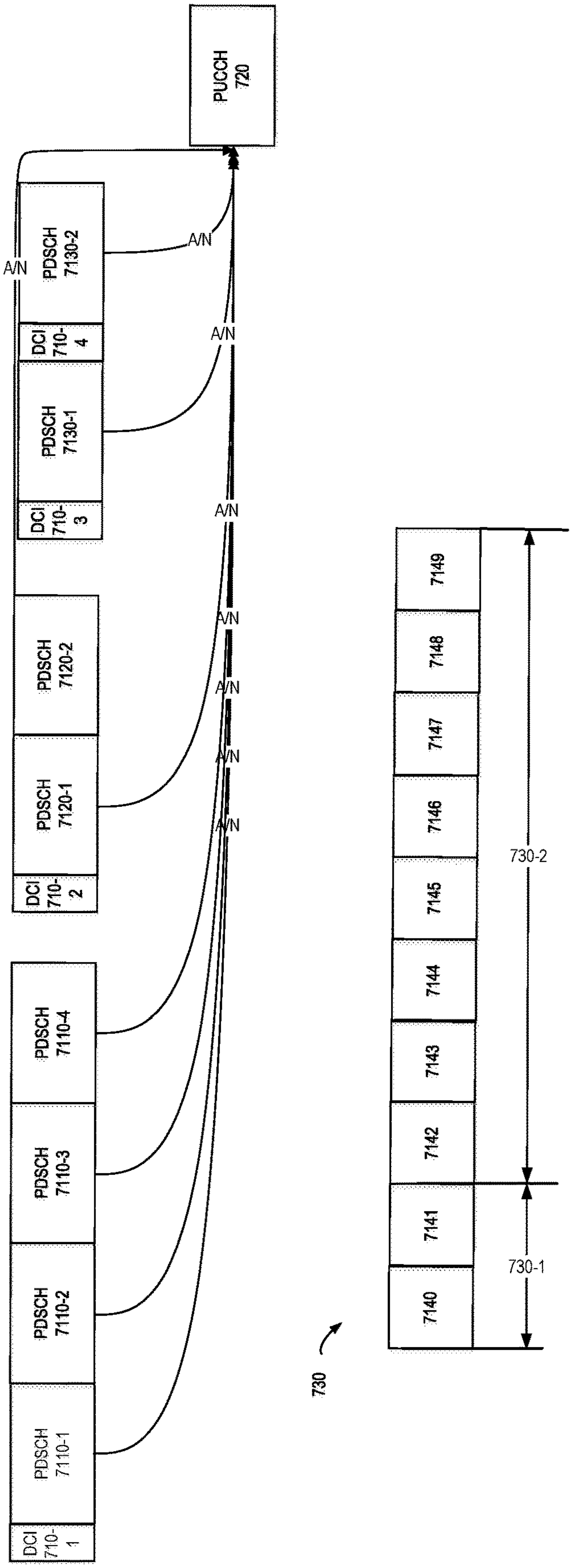
FIG. 7 illustrates a simplified block diagram of a HARQ-ACK codebook according to some embodiments of the present disclosure.

FIG. 7 shows an example HARQ-ACK CB according to some embodiments of the present disclosure. As shown in FIG. 7, the DCI 710-1 with C-DAI being 1 and t-DAI being 1 may schedule the PDSCHs 7110-1, 7110-2, 7110-3, and 7110-4. The DCI 710-2 with C-DAI being 2 and t-DAI being 2 may activate the SPS PDSCHs 7120-1 and 7120-2. The DCI 710-3 with C-DAI being 1 and t-DAI being 1 may schedule the PDSCH 7130-1. The DCI 710-4 with C-DAI being 2 and t-DAI being 2 may schedule the PDSCH 7130-2. HARQ codebook 730 can be transmitted on the PUCCH 720. The HARQ codebook 730 can comprise a first sub-codebook 730-1 for a single-TB scheduling and a second sub-codebook 730-2 for multi-TB scheduling. The HARQ position 7140 is for the feedback of the PDSCH 7130-1 and the HARQ position 7141 is for the feedback of the PDSCH 7130-2. The HARQ positions 7142, 7143, 7144 and 7145 are for the feedbacks of the PDSCHs 7110-1, 7110-2, 7110-3, and 7110-4, respectively. The HARQ position 7146 is for the feedback of the SPS PDSCH 7120-1 and the HARQ position 7147 is for the feedback of the SPS PDSCH 7120-2. The HARQ positions 7148 and 7149 are used for feedbacks of other PDSCH.

Figure 8:
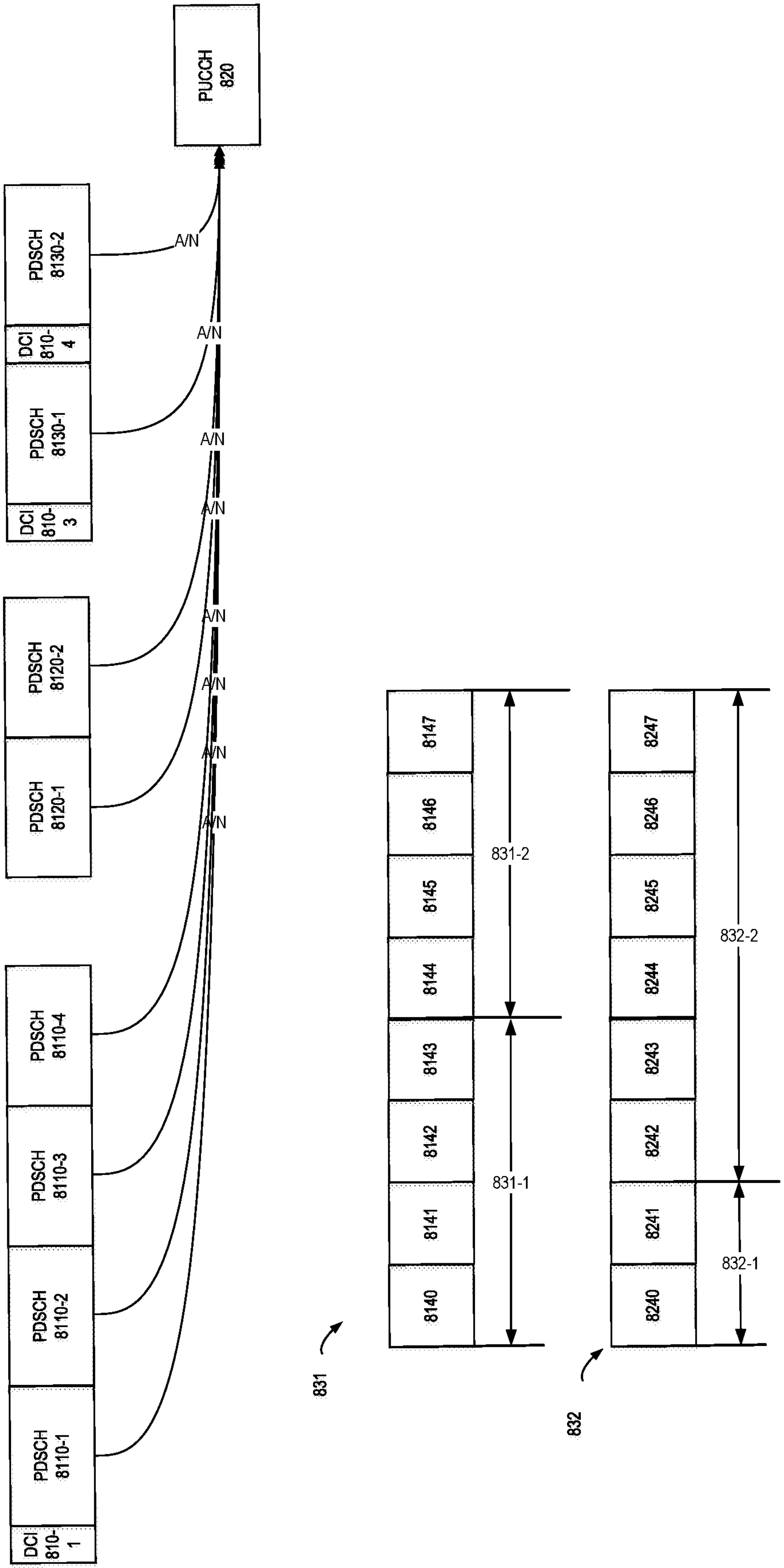
FIG. 8 illustrates a simplified block diagram of a HARQ-ACK codebook according to some embodiments of the present disclosure.

FIG. 8 shows an example HARQ-ACK CB according to some embodiments of the present disclosure. As shown in FIG. 8, the DCI 810-1 with C-DAI being 1 and t-DAI being 1 may schedule the PDSCHs 8110-1, 8110-2, 8110-3, and 8110-4. The DCI 810-3 with C-DAI being 1 and t-DAI being 1 may schedule the PDSCH 8130-1. The DCI 810-4 with C-DAI being 2 and t-DAI being 2 may schedule the PDSCH 8130-2. The HARQ-ACK bits for dynamic scheduled PDSCH 8110-1, 8110-2, 8110-3, 8110-4, 8130-1, 8130-2 and SPS PDSCH 8120-1, 8120-2 are multiplexed on PUCCH 820. Then HARQ-ACK codebook 831 or 832 can be transmitted on the PUCCH 820.

In some embodiments, as shown in FIG. 8, the HARQ codebook 831 can comprise a first sub-codebook 831-1 for a single-TB scheduling and a second sub-codebook 831-2 for multi-TB scheduling. The HARQ position 8140 is for the feedback of the PDSCH 8130-1 and the HARQ position 8141 is for the feedback of the PDSCH 8130-2.

In other embodiments, as shown in FIG. 8, the HARQ codebook 832 can comprise a first sub-codebook 832-1 for a single-TB scheduling and a second sub-codebook 832-2 for multi-TB scheduling. The HARQ position 8240 is for the feedback of the PDSCH 8130-1 and the HARQ position 8241 is for the feedback of the PDSCH 8130-2. The HARQ positions 8242, 8243, 8244 and 8245 are for the feedbacks of the PDSCHs 8210-1, 8210-2, 8210-3, and 8210-4, respectively. The HARQ position 8246 is for the feedback of the SPS PDSCH 8120-1 and the HARQ position 8247 is for the feedback of the SPS PDSCH 8120-2.

Figure 9A:
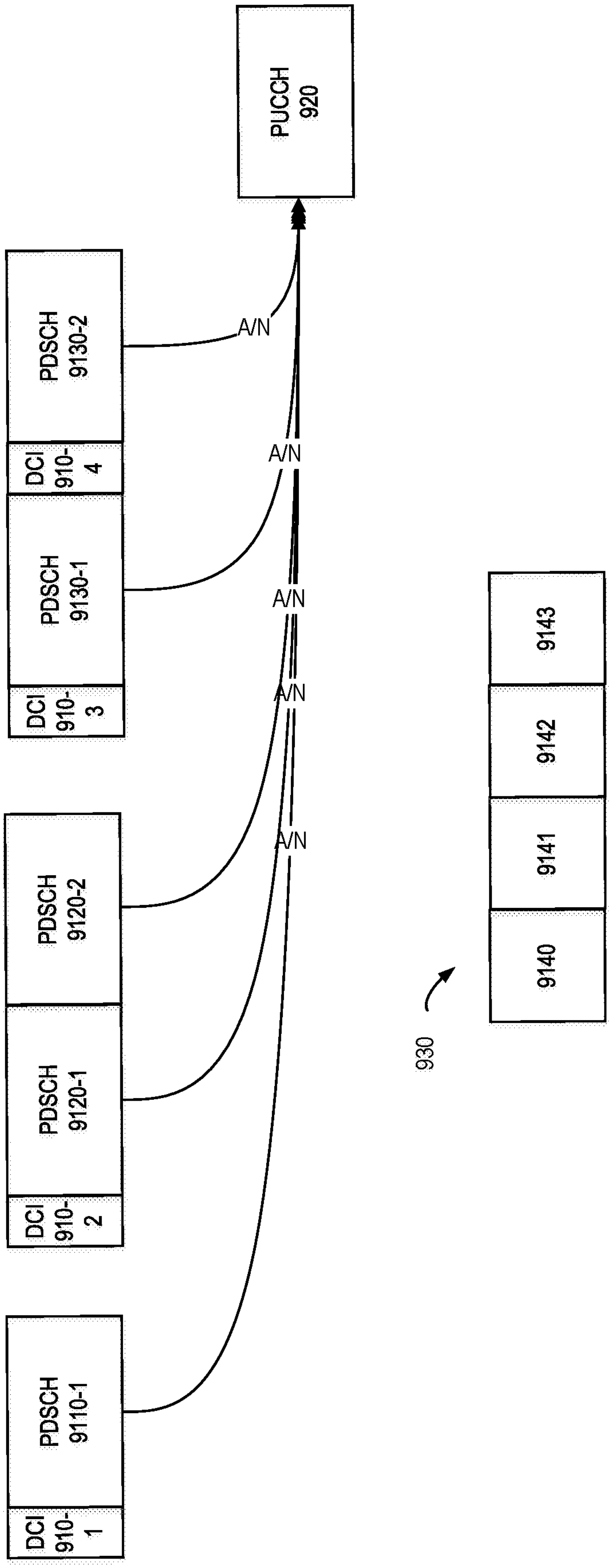
FIGS. 9A to 9C illustrates a simplified block diagram of a HARQ-ACK codebook according to some embodiments of the present disclosure.

In some embodiments, the CB may only include HARQ feedback for single PDSCH scheduling. For example, HARQ-ACK bits can be bundled for the first M SPS PDSCHs within a SPS periodicity with activation DCI as 1 HARQ-ACK bit by AND operation of HARQ-ACK values of M SPS PDSCHs, the 1 HARQ-ACK bit order in the Type-2 CB is determined based on the c-DAI/t-DAI in the activation DCI. For the M SPS PDSCHs within a SPS periodicity without activation DCI, UE generates M HARQ-ACK positions for the M SPS PDSCHs, the M HARQ-ACK bits are placed after the HARQ-ACK bits for dynamic scheduled PDSCHs. For example, as shown in FIG. 9A, the DCI 910-1 with C-DAI being 1 and t-DAI being 1 may schedule the PDSCHs 9110-1. The DCI 910-2 with C-DAI being 2 and t-DAI being 2 may activate the SPS PDSCHs 9120-1 and 9120-2. The DCI 910-3 with C-DAI being 3 and t-DAI being 3 may schedule the PDSCH 9130-1. The DCI 910-4 with C-DAI being 4 and t-DAI being 4 may schedule the PDSCH 9130-2. HARQ codebook 930 can be transmitted on the PUCCH 920. The HARQ position 9140 is for the feedback of the PDSCH 9110-1. The HARQ position 9141 is for the feedback for the SPS PDSCHs 9120-1 and 9120-2. The HARQ position 9142 is for the feedback for the PDSCH 9130-1 and the HARQ position 9143 is for the feedback for the PDSCH 9130-2.

Figure 9B:
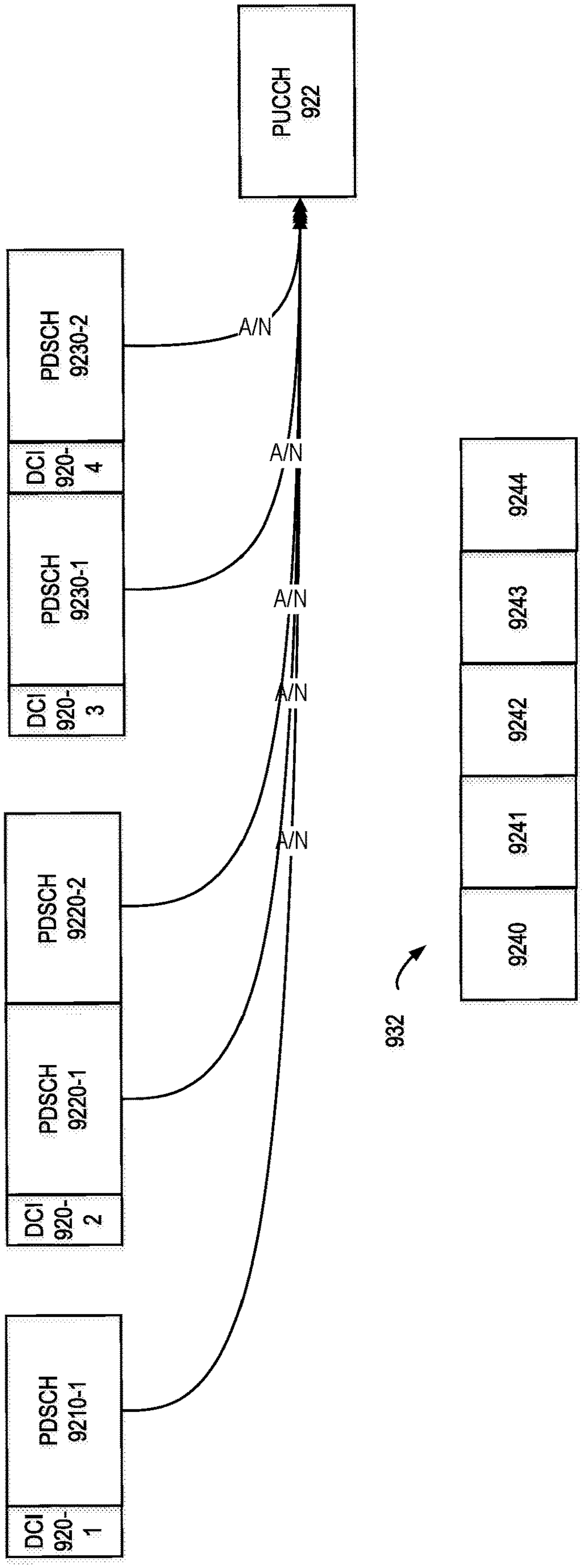

Alternatively, the c-DAI in the activation DCI may indicate order of the first activated SPS PDSCH reception, the t-DAI in the activation DCI may calculated based on the total number of SPS PDSCHs receptions and DG PDSCH receptions in current PDCCH monitoring occasion. For the M SPS PDSCHs within a SPS periodicity without activation DCI, the terminal device 110-1 may generate M HARQ-ACK positions for the M SPS PDSCHs, the M HARQ-ACK bits are placed after the HARQ-ACK bits for dynamic scheduled PDSCHs. For example, as shown in FIG. 9B, the DCI 920-1 with C-DAI being 1 and t-DAI being 1 may schedule the PDSCHs 9210-1. The DCI 920-2 with C-DAI being 2 and t-DAI being 3 may activate the SPS PDSCHs 9220-1 and 9220-2. The DCI 920-3 with C-DAI being 4 and t-DAI being 4 may schedule the PDSCH 9230-1. The DCI 920-4 with C-DAI being 5 and t-DAI being 5 may schedule the PDSCH 9230-2. HARQ codebook 932 can be transmitted on the PUCCH 922. The HARQ position 9240 is for the feedback of the PDSCH 9210-1. The HARQ position 9241 can be for the feedback for the SPS PDSCH 9220-1 and the HARQ position 9242 can be for the feedback for the SPS PDSCH 9220-2. The HARQ position 9243 is for the feedback for the PDSCH 9230-1 and the HARQ position 9244 is for the feedback for the PDSCH 9230-2.

Figure 9C:
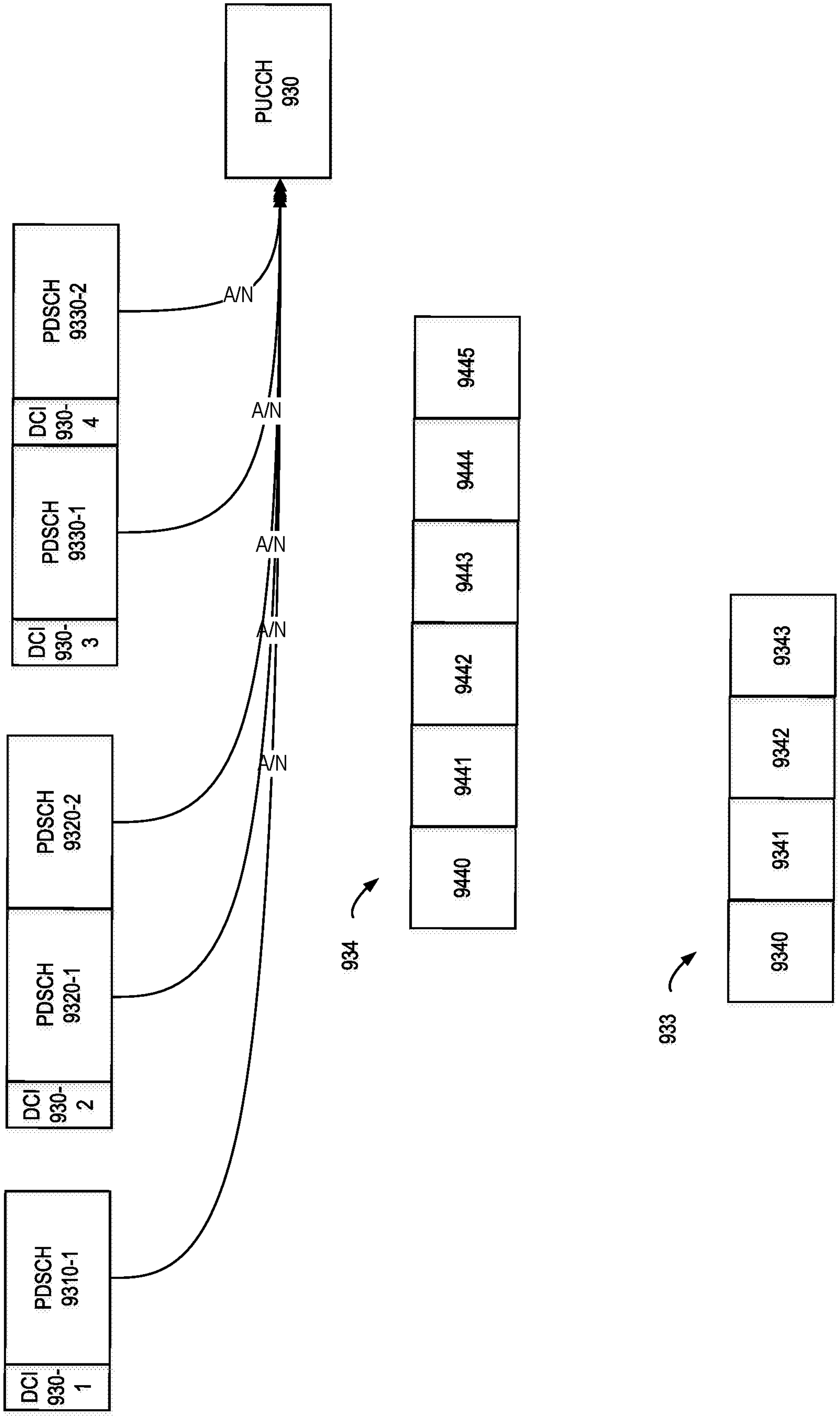

Alternatively, the terminal device 110-1 may generate 1-bit HARQ-ACK position for PDCCH for activation DCI of SPS configuration, its HARQ-ACK bit order in Type-2 CB is based on the c-DAI value in the activation DCI. Whether the terminal device 110-1 generates M HARQ-ACK positions for the first activated M SPS PDSCHs with activation DCI may depend on the decoding result of the PDCCH. If the PDCCH is successfully decoded, the terminal device 110-1 will generate M HARQ-ACK positions for the first activated M SPS PDSCHs, M may be indicated by the activation DCI or configured by RRC. If A is not detected or decoded successfully, the terminal device 110-1 will not generate HARQ-ACK positions for the first activated M SPS PDSCHs. For the M SPS PDSCHs within a SPS periodicity without activation DCI, the terminal device 110-1 generates M HARQ-ACK positions for the M SPS PDSCHs, the M HARQ-ACK bits are placed after the HARQ-ACK bits for dynamic scheduled PDSCHs. For example, as shown in FIG. 9C, the DCI 930-1 with C-DAI being 1 and t-DAI being 1 may schedule the PDSCHs 9310-1. The DCI 930-2 with C-DAI being 2 and t-DAI being 2 may activate the SPS PDSCHs 9320-1 and 9320-2. The DCI 930-3 with C-DAI being 3 and t-DAI being 3 may schedule the PDSCH 9330-1. The DCI 930-4 with C-DAI being 4 and t-DAI being 4 may schedule the PDSCH 9330-2.

In some embodiments, the HARQ codebook 933 can be transmitted on the PUCCH 930. The HARQ position 9340 is for the feedback of the PDSCH 9310-1. The HARQ position 9241 can be for the NACK feedback for the DCI 930-2. The HARQ position 9342 is for the feedback for the PDSCH 9330-1 and the HARQ position 9343 is for the feedback for the PDSCH 9330-2.

Alternatively, the HARQ codebook 934 can be transmitted on the PUCCH 930. The HARQ position 9440 is for the feedback of the PDSCH 9310-1. The HARQ position 9441 can be for the ACK feedback for the DCI 930-2. The HARQ position 9442 is for the feedback for the PDSCH 9330-1 and the HARQ position 9443 is for the feedback for the PDSCH 9330-2. The HARQ position 9444 is for the feedback for the SPS PDSCH 9320-1 and the HARQ position 9445 is for the feedback for the SPS PDSCH 9320-2.

The terminal device 110-1 transmits 2040 the HARQ feedback information to the network device 120.

Figure 10:
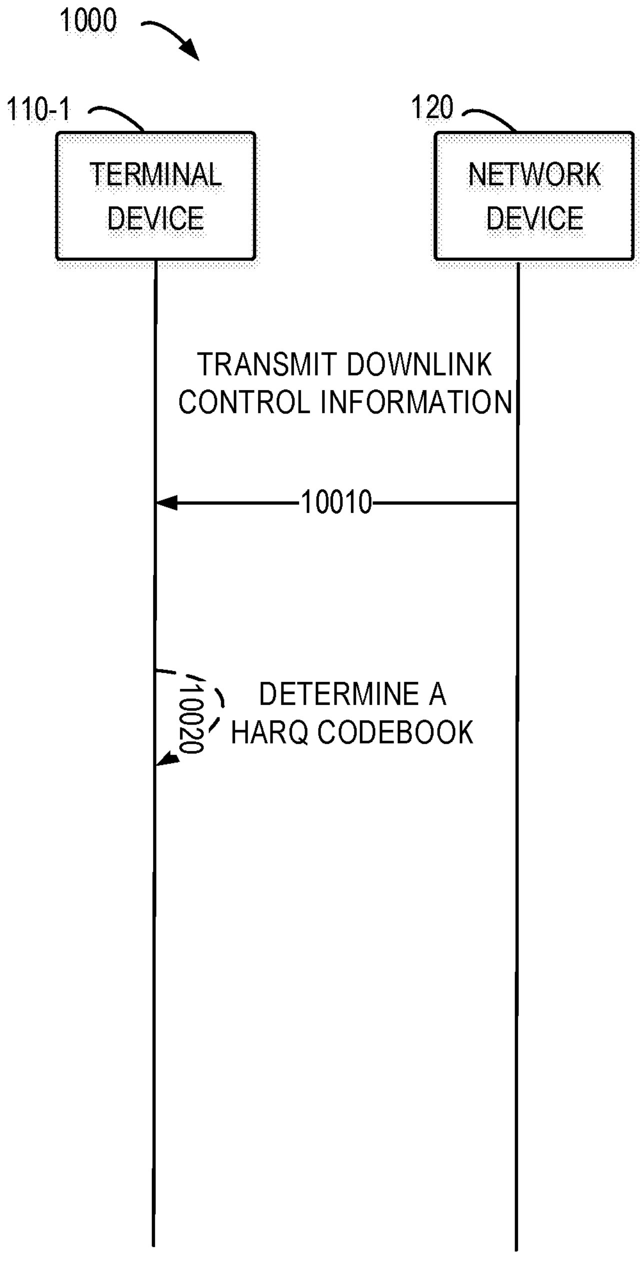
FIG. 10 illustrates a signaling flow for communications according to some embodiments of the present disclosure.

Embodiments of the present disclosure will be described in detail below. Reference is first made to FIG. 10, which shows a signaling chart illustrating process 1000 among network devices according to some example embodiments of the present disclosure. Only for the purpose of discussion, the process 1000 will be described with reference to FIG. 1. The process 1000 may involve the terminal device 110-1 and the network device 120 in FIG. 1.

The network device 120 transmits 10010 control information to the terminal device 110-1. The control information indicates a number of CBGs for a semi-persistent scheduling data transmission per periodicity of a semi-persistent scheduling configuration. In some embodiments, the semi-persistent scheduling data transmission can be DL semi-persistent scheduling data transmission, namely SPS PDSCH. Alternatively, semi-persistent scheduling data transmission can be UL semi-persistent scheduling data transmission, namely CG PUSCH. In this way, it designs the signaling to configure/indicate the number of CBG for a SPS PDSCH/CG PUSCH transmission for UE, then CBG based transmission for SPS/CG transmission for large periodic data packet is enabled to improve the spectrum efficiency for XR traffic.

In one embodiment, if the terminal device 110-1 is configured to receive code block group (CBG) based transmissions by receiving the higher layer parameter codeBlockGroupTransmission for PDSCH, the terminal device 110-1 may determine the number of CBGs for a transport block reception as =min(N,C), CNM, where N is the maximum number of CBGs per transport block as configured by maxCodeBlockGroupsPerTransportBlock for PDSCH, and C is the number of code blocks in the transport block.

In one embodiment, if a terminal device 110-1 is configured to receive code block group-based transmissions by receiving the higher layer parameter codeBlockGroup Transmission for PDSCH,

- The 'CBG transmission information' (CBGTI) field of DCI format 1_1 is of length $N_{TB}$·N bits, where $N_{TB}$ is the value of the higher layer parameter maxNrofCodeWordsScheduledByDCI. If $N_{TB}$=2 the CBGTI field bits are mapped such that the first set of N bits starting from the MSB corresponds to the first TB while the second set of N bits corresponds to a second TB, if scheduled. The first M bits of each set of N bits in the CBGTI field have an in-order one-to-one mapping with the M CBGs of the TB, with the MSB mapped to CBG #0.
- For initial transmission of a TB as indicated by the 'New Data Indicator' field of the scheduling DCI, the UE may assume that all the code block groups of the TB are present.
- For a retransmission of a TB as indicated by the 'New Data Indicator' field of the scheduling DCI, the UE may assume that
  - The 'CBGTI' field of the scheduling DCI indicates which CBGs of the TB are present in the transmission. A bit value of '0' in the CBGTI field indicates that the corresponding CBG is not transmitted and '1' indicates that it is transmitted.
  - If the 'CBG flushing out information' (CBGFI) field of the scheduling DCI is present, 'CBGFI' set to '0' indicates that the earlier received instances of the same CBGs being transmitted may be corrupted, and 'CBGFI' set to '1' indicates that the CBGs being retransmitted are combinable with the earlier received instances of the same CBGs.
  - A CBG contains the same CBs as in the initial transmission of the TB.

In one embodiment, for the DCI format 0_1, CBG transmission information (CBGTI)—0 bit if higher layer parameter codeBlockGroupTransmission for PUSCH is not configured or if the number of scheduled PUSCH indicated by the Time domain resource assignment field is larger than 1; otherwise, 2, 4, 6, or 8 bits determined by higher layer parameter maxCodeBlockGroupsPerTransportBlock for PUSCH.

In one embodiment, for DCI format 1_1, CBG transmission information (CBGTI)—0 bit if higher layer parameter codeBlockGroupTransmission for PDSCH is not configured, otherwise, 2, 4, 6, or 8 bits as defined in Clause 5.1.7 of [6, TS38.214], determined by the higher layer parameters maxCodeBlockGroupsPerTransportBlock and maxNrofCodeWordsScheduledByDCI for the PDSCH.

In one embodiment, if higher layer parameter priorityIndicatorDCI-1-1 is configured, if the bit width of the CBG transmission information in DCI format 1_1 for one HARQ-ACK codebook is not equal to that of the CBG transmission information in DCI format 1_1 for the other HARQ-ACK codebook, a number of most significant bits with value set to ‘0’ are inserted to smaller CBG transmission information until the bit width of the CBG transmission information in DCI format 1_1 for the two HARQ-ACK codebooks are the same.

CBG flushing out information (CBGFI—1 bit if higher layer parameter codeBlockGroupFlushIndicator is configured as “TRUE”, 0 bit otherwise.

In one embodiment, if higher layer parameter priorityIndicatorDCI-1-1 is configured, if the bit width of the CBG flushing out information in DCI format 1_1 for one HARQ-ACK codebook is not equal to that of the CBG flushing out information in DCI format 1_1 for the other HARQ-ACK codebook, a number of most significant bits with value set to ‘0’ are inserted to smaller CBG flushing out information until the bit width of the CBG flushing out information in DCI format 1_1 for the two HARQ-ACK codebooks are the same.

In one embodiment, if a UE is provided PDSCH-CodeBlockGroupTransmission for a serving cell, the UE receives a PDSCH scheduled by DCI format 1_1, that includes code block groups (CBGs) of a transport block. The UE is also provided maxCodeBlockGroupsPerTransportBlock indicating a maximum number $$N_{HARQ-ACK}^{CBG/TB,max}$$

of CBGs for generating respective HARQ-ACK information bits for a transport block reception for the serving cell.

In one embodiment, for a number of C code blocks (CBs) in a transport block, the UE may determines a number of CBGs M according to Clause 5.1.7.1 of [6, TS 38.214] and determines a number of HARQ-ACK bits for the transport block as $$N_{GARQ-ACK}^{CBG,TB} = M.$$

In some embodiments, the control information can be transmitted in a higher layer configuration. For example, the maxCodeBlockGroupsPerTransportBlock configured in the PDSCH-ServingCellConfig/PUSCH-ServingCellConfig is shared/common for SPS PDSCH/CG PUSCH and dynamic scheduled (DG) PDSCH/PUSCH. Alternatively, the number of CBG per SPS PDSCH/CG PUSCH can be configured for all SPS configurations/CG configurations per cell, for example, via maxCodeBlockGroupsPerSPSTransportBlock/maxCodeBlockGroupsPerCGTransportBlock. Alternatively, the number of CBG per SPS PDSCH/CG PUSCH for each SPS configuration/CG configuration can be configured separately, for example, maxCodeBlockGroupsPerTransportBlock in SPS-Config/ConfiguredGrantConfig.

Alternatively, the control information can be transmitted in downlink control information (DCI). In some embodiments, a new field can be introduced or reinterpret the unused field in the activation DCI to explicitly indicate the number of CBG per TB for a SPS/CG configuration. Alternatively, the DCI may implicitly indicate the number of CBG per TB for SPS/CG by the CBGTI field in the activation DCI, for example, when the bit width of CBGTI field=4, the value=1100, then the No. of CBG per TB for SPS/CG equals to the number of 1 values in the field, i.e., is 2.

Figure 11:
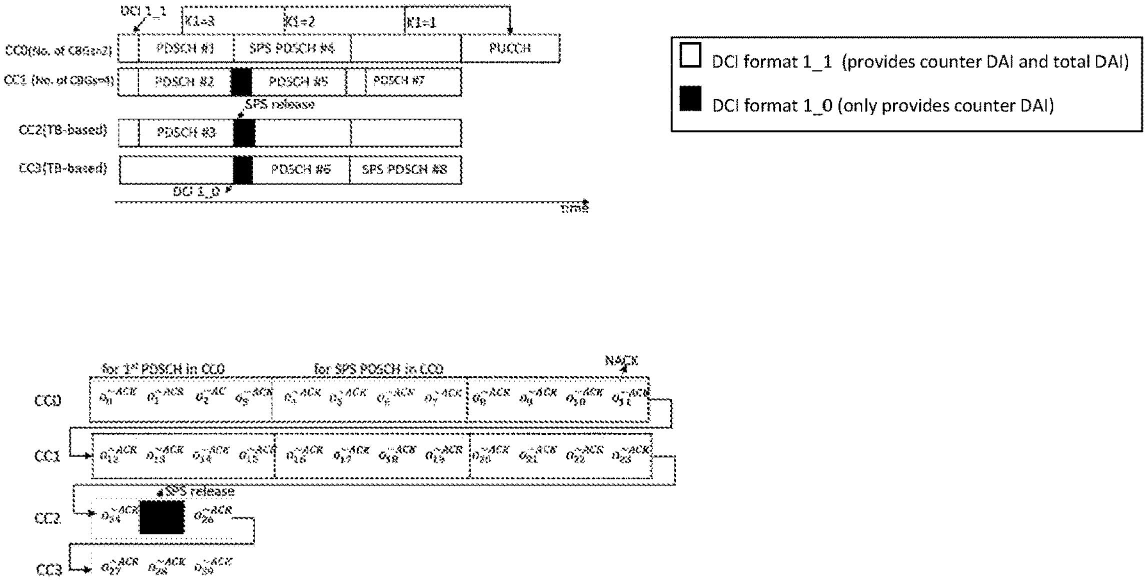
FIG. 11 illustrates a simplified block diagram of a HARQ-ACK codebook according to some embodiments of the present disclosure.

In some embodiments, the terminal device 110-1 may determine 10020 a HARQ codebook. In some embodiments, for Type-1 CB, if separate maxCodeBlockGroupsPerTransportBlock configuration for SPS PDSCH and DG PDSCH on a cell is supported, when construct the Type-1 CB including HARQ-ACK bits for both SPS PDSCH and DG PDSCH, the number of HARQ-ACK position for a PDSCH occasion can be determined by maximum {the number. of CBG for DG PDSCH, the number. of CBG for SPS PDSCH}. For example, as shown in FIG. 11, the number of the HARQ-ACK positions can be determined based on the larger one between the number of DG PDSCH and the SPS PDSCH.

The terminal device 110-1 may generate an ACK for the HARQ-ACK information bit of a CBG if the UE correctly received all code blocks of the CBG and generate a NACK for the HARQ-ACK information bit of a CBG if the terminal device 110-1 incorrectly received at least one code block of the CBG. If the terminal device 110-1 receives two transport blocks, the terminal device 110-1 may concatenate the HARQ-ACK information bits for CBGs of the second transport block after the HARQ-ACK information bits for CBGs of the first transport block.

The HARQ-ACK codebook includes the $$N_{HARQ-ACK}^{CBG/TB,max}$$

HARQ-ACK information bits and, if $$N_{HARQ-ACK}^{CBG/TB} < N_{HARQ-ACK}^{CBG/TB,max}$$

for a transport block, the terminal device 110-1 may generate a NACK value for the last $$N_{HARQ-ACK}^{CBG/TB,max} - N_{HARQ-ACK}^{CBG/TB}$$

HARQ-ACK information bits for the transport block in the HARQ-ACK codebook.

If the terminal device 110-1 may generate a HARQ-ACK codebook in response to a retransmission of a transport block, corresponding to a same HARQ process as a previous transmission of the transport block, the UE generates an ACK for each CBG that the UE correctly decoded in a previous transmission of the transport block. If a UE correctly detects each of the $$N_{HARQ-ACK}^{CBG/TB}$$

CBGs and does not correctly detect the transport block for the $$N_{HARQ-ACK}^{CBG/TB}$$

CBGs, the terminal device 110-1 may generate a NACK value for each of the $$N_{HARQ-ACK}^{CBG/TB}$$

CBGs.

Figure 12:
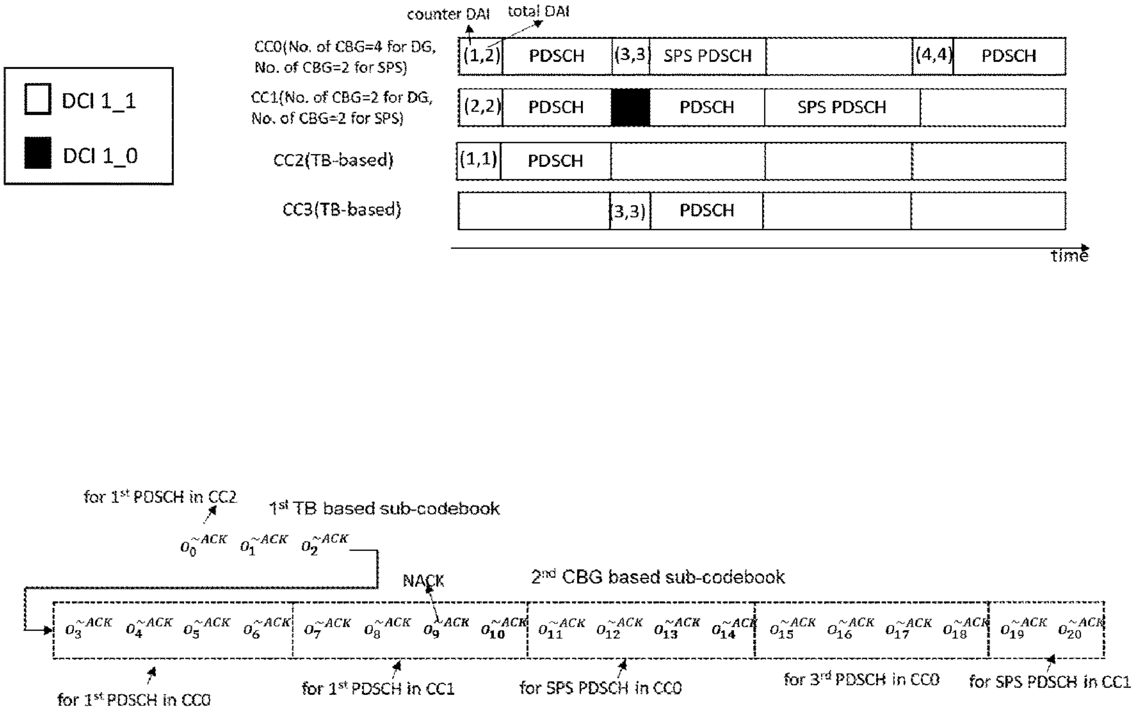
FIG. 12 illustrates a simplified block diagram of a HARQ-ACK codebook according to some embodiments of the present disclosure.

Alternatively, if separate maxCodeBlockGroupsPerTransportBlock configuration for SPS PDSCH and DG PDSCH on a cell is supported, the number of HARQ-ACK positions for a SPS PDSCH occasion without PDCCH is based on the configured/indicated number of CBG per TB for SPS PDSCH, the CBG based HARQ-ACK bits for SPS PDSCH(s) is placed after DG HARQ-ACK bits on the TB-based sub-CB or after DG HARQ-ACK bits on the CBG-based sub-CB. The number of CBG based HARQ-ACK positions for the first SPS PDSCH with activation PDCCH can be based on the configured number of CBG per TB for DG PDSCH, alternatively, the number of CBG based HARQ-ACK positions for the first SPS PDSCH with activation PDCCH can be based on the largest one of configured number of CBG for DG PDSCH and number of CBG for SPS PDSCH. The CBG based HARQ-ACK bits for the first SPS PDSCH with activation PDCCH can be placed on sub-CB for the CBG-based CB for DG HARQ-ACK bits based on the DAI values in the activation DCI. For example, as shown in FIG. 12, the number of HARQ-ACK positions for the first SPS PDSCH with activation PDCCH can be based on the configured number of CBG per TB for DG PDSCH, the CBG based HARQ-ACK bits for the first SPS PDSCH with activation PDCCH can be placed on sub-CB for the CBG-based CB for DG HARQ-ACK bits based on the DAI values in the activation DCI.

In other embodiments, for Type-2 CB, if separate maxCodeBlockGroupsPerTransportBlock configuration for SPS PDSCH and DG PDSCH on a cell is supported, the terminal device 110-1 may generate 1-bit HARQ-ACK position for PDCCH for activation DCI of SPS configuration in the first TB based sub-CB, its HARQ-ACK bit order is based on the c-DAI value in the activation DCI. The number of CBG based HARQ-ACK positions for a SPS PDSCH occasion with activation DCI may depend on the decoding result of the PDCCH and the configured/indicated No. of CBG per TB for SPS PDSCH (e.g., N). If the PDCCH is successfully decoded, the terminal device 110-1 may generate N CBG based HARQ-ACK positions for the first activated SPS PDSCH. If the PDCCH is not detected or decoded successfully, the terminal device 110-1 may generate 0 HARQ-ACK positions for the first activated SPS PDSCH. The number of HARQ-ACK positions for a SPS PDSCH occasion without PDCCH can be based on the configured/indicated No. of CBG per TB for SPS PDSCH, the CBG based HARQ-ACK bits for SPS PDSCH with/without PDCCH can be placed after HARQ-ACK bits for dynamic scheduled PDSCHs on the CBG-based sub-CB.

In other embodiments, for Type-2 CB, if separate maxCodeBlockGroupsPerTransportBlock configuration for SPS PDSCH and DG PDSCH on a cell is supported, the terminal device 110-1 may generate three sub-codebooks, one is for TB based HARQ-ACK bits, one is for CBG based HARQ-ACK bits for dynamic scheduled PDSCHs, the other one is for CBG based HARQ-ACK bits for SPS PDSCHs.

Figure 13:
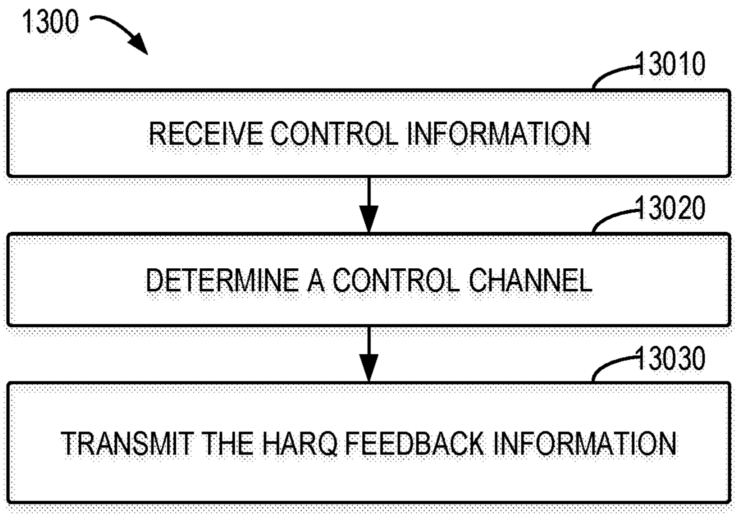
FIG. 13 is a flowchart of an example method in accordance with an embodiment of the present disclosure.

FIG. 13 shows a flowchart of an example method 1300 in accordance with an embodiment of the present disclosure. The method 1300 can be implemented at any suitable devices. Only for the purpose of illustrations, the method 1300 can be implemented at a terminal device 110-1 as shown in FIG. 1.

At block 1310, the terminal device 110-1 receives, from the network device 120, control information indicating a pattern of a set of semi-persistent scheduling physical downlink shared channel (SPS PDSCH) occasions for data transmission per periodicity of a transmission configuration. In some embodiments, the pattern may comprise one or more of: the number of the set of SPS PDSCH occasions; and a time domain location and/or a frequency domain location of the set of SPS PDSCH occasions.

In some embodiments, the terminal device 110-1 may receive the control information in a radio resource control (RRC) configuration. Alternatively, the terminal device 110-1 may receive the control information in downlink control information (DCI).

In some embodiments, the terminal device 110-1 may receive a RRC configuration comprising the control information which indicates a plurality of patterns of the set of SPS PDSCH occasions. In some embodiments, the terminal device 110-1 may receive, from the network device, DCI comprising an indication of a target pattern. The terminal device 110-1 may determine the target pattern from the plurality of patterns based on the indication.

In some embodiments, the terminal device 110-1 may receive, from the network device 120, DCI comprising an indication of row index from a time domain resource allocation set. The terminal device 110-1 may determine the pattern of the set of SPS PDSCH occasion based on start and length indicator values (SLIVs) associated with the row index. For example, the number of SPS PDSCH occasions in a period equal to the number of SLIVs associated with the row index. The location of one SPS PDSCH occasion is determined based on a gap between SLIVs, if the gap is 0, then SPS PDSCH occasions are continuous in time domain.

In some embodiments, the terminal device 110-1 may receive, from the network device 120, DCI comprising an indication of component carrier (CC) index for each SPS PDSCH occasion. The terminal device 110-1 may determine the pattern of the set of SPS PDSCH transmission occasions based on the CC index indication.

In some embodiments, if slot aggregation is configured for the data transmission, the terminal device 110-1 may determine a transmission pattern for the data transmission on the set of SPS PDSCH occasions within a periodicity. Alternatively, if a repetition is configured for the data transmission, the terminal device 110-1 may determine a transmission pattern for the data transmission on the set of CG PUSCH occasions within a periodicity. The term "slot aggregation" used herein can refer to a technique wherein data transmission can be scheduled to span one or multiple slots.

When receiving PDSCH scheduled by DCI format 1_1 or 1_2 in PDCCH with CRC scrambled by C-RNTI, MCS-C-RNTI, or CS-RNTI with NDI=1, if the terminal device 110-1 is configured with pdsch-AggregationFactor in pdsch-config, the same symbol allocation is applied across the pdsch-AggregationFactor consecutive slots. When receiving PDSCH scheduled by DCI format 1_1 or 1_2 in PDCCH with CRC scrambled by CS-RNTI with NDI=0, or PDSCH scheduled without corresponding PDCCH transmission using sps-Config and activated by DCI format 1_1 or 1_2, the same symbol allocation is applied across the pdsch-AggregationFactor, in sps-Config if configured, or across the pdsch-AggregationFactor in pdsch-config otherwise, consecutive slots. The terminal device 110-1 may expect that the TB is repeated within each symbol allocation among each of the pdsch-AggregationFactor consecutive slots and the PDSCH is limited to a single transmission layer. For PDSCH scheduled by DCI format 1_1 or 1_2 in PDCCH with CRC scrambled by CS-RNTI with NDI=0, or PDSCH scheduled without corresponding PDCCH transmission using sps-Config and activated by DCI format 1_1 or 1_2, the UE is not expected to be configured with the time duration for the reception of pdsch-AggregationFactor repetitions, in sps-Config if configured, or across the pdsch-AggregationFactor in pdsch-config otherwise, larger than the time duration derived by the periodicity P obtained from the corresponding sps-Config. The redundancy version to be applied on the $n^{th}$ transmission occasion of the TB, where n=0, 1, . . . pdsch-AggregationFactor−1, is determined according to table 5.1.2.1-2 and "$rv_{id}$ indicated by the DCI scheduling the PDSCH" in table 5.1.2.1-2 is assumed to be 0 for PDSCH scheduled without corresponding PDCCH transmission using sps-Config and activated by DCI format 1_1 or 1_2.

If the terminal device 110-1 is configured with higher layer parameter repetitionNumber or if the UE is configured by repetitionScheme set to one of 'fdmSchemeA', 'fdmSchemeB' and 'tdmSchemeA', the UE does not expect to be configured with pdsch-AggregationFactor.

At block 1320, if the data transmission is received on the set of SPS PDSCH occasions, the terminal device 110-1 determines a control channel for transmitting hybrid automatic repeat request, HARQ, feedback information associated with the data transmission.

In some embodiments, the terminal device 110-1 may determine the control channel based on a last transmission occasion. The last transmission occasion is one of: the last transmission occasion in the periodicity regardless of whether the nominal last transmission occasion collides with an uplink symbol, an actual last transmission occasion which does not collide with the uplink symbol, a last transmission occasion in time domain on lowest CC index, a last transmission occasion in time domain among the set of transmission occasions on a plurality of CCs.

In some embodiments, if HARQ-ACK for the data transmissions on the set of SPS PDSCH occasions is multiplexed with HARQ-ACK for at least a dynamic scheduled data transmission on the control channel, the terminal device 110-1 may contruct a Type-2 HARQ-ACK codebook comprising the HARQ-ACK for the SPS PDSCH transmissions and the HARQ-ACK for the dynamic scheduled PDSCH transmissions.

In some embodiments, the HARQ-ACK codebook comprises a first sub-codebook for single PDSCH transmission scheduling and a second sub-codebook for multiple PDSCH transmissions scheduling, and the M is the number of the set of SPS PDSCH occasions in a periodicity; and wherein the HARQ-ACK for the first M SPS PDSCH occasions with corresponding activation DCI is placed in the second sub-codebook based on the DAI values carried in the activation DCI; and wherein the HARQ-ACK for the M SPS PDSCH occasions without corresponding activation DCI is placed in the end of the first sub-codebook or the second sub-codebook.

In some embodiments, the HARQ-ACK codebook comprises HARQ-ACK positions for only single PDSCH transmission scheduling and HARQ-ACK positions for at least a set of SPS PDSCH transmissions, and the M is the number of the set of SPS PDSCH occasions in a periodicity; and the bundling the HARQ-ACK bits for the first M SPS PDSCH occasions with corresponding activation DCI as one HARQ-ACK bit. The terminal device 110-1 may determine the HARQ position in the codebook for the one HARQ-ACK bit based on the DAI values carried in the activation DCI; and wherein the HARQ-ACK bits for the M SPS PDSCH occasions without corresponding activation DCI are placed in the end of HARQ-ACK bits for the dynamic scheduled PDSCH transmissions.

In some embodiments, n the HARQ-ACK codebook comprises HARQ-ACK positions for only single PDSCH transmission scheduling and a HARQ-ACK position of PDCCH which activates the SPS configuration, the M is the number of the set of SPS PDSCH occasions in a periodicity. The terminal device 110-1 may generate one HARQ-ACK bit for the PDCCH for activation DCI and determining the HARQ-ACK position of the one HARQ-ACK bit in the codebook based the DAI values carried in the activation DCI. If the PDCCH is successfully decoded, the terminal device 110-1 may generate HARQ-ACK for the first M SPS PDSCH occasions with corresponding activation DCI. The HARQ-ACK bits for the M SPS PDSCH occasions can be placed in the end of HARQ-ACK bits for the dynamic scheduled PDSCH transmissions.

At block 1320, the terminal device 110-1 transmits the HARQ feedback information on the control channel to the network device.

Figure 14:
FIG. 14 is a flowchart of an example method in accordance with an embodiment of the present disclosure.

FIG. 14 shows a flowchart of an example method 1400 in accordance with an embodiment of the present disclosure. The method 1400 can be implemented at any suitable devices. Only for the purpose of illustrations, the method 1400 can be implemented at a terminal device 110-1 as shown in FIG. 1.

At block 1410, the terminal device 110-1 receives, from a network device 120, control information indicating a number of code block groups (CBGs) for a semi-persistent scheduling data channel per periodicity of a semi-persistent scheduling configuration.

In some embodiments, the terminal device 110-1 may receive the control information in a radio resource control (RRC) configuration. The number of CBGs are common for the semi-persistent scheduling data channel and a dynamic scheduling data channel; or the number of CBGs are configured per semi-persistent scheduling data channel for all semi-persistent scheduling configurations; or the number of CBGs are configured per semi-persistent scheduling data channel for each semi-persistent scheduling configuration.

In some embodiments, the terminal device 110-1 may receive the control information in downlink control information (DCI) which comprises a field indicating the number of CBGs.

In some embodiments, the terminal device 110-1 may receive the control information in downlink control information (DCI) which comprises a field indicating CBG transmission information.

In some embodiments, the semi-persistent scheduling data channel is a semi-persistent scheduling physical downlink shared channel (SPS PDSCH). If HARQ-ACK for the SPS PDSCH is multiplexed with HARQ-ACK for dynamic granted PDSCH (DG PDSCH), the terminal device 110-1 may construct a HARQ-ACK codebook comprising HARQ-ACK positions for the SPS PDSCH and DG PDSCH.

In some embodiments, the number of HARQ-ACK positions in a CC configured with CBG based transmission is determined based on a larger one between the number of CBGs for the SPS PDSCH and the number of CBGs for the DG PDSCH.

In some embodiments, the number of HARQ-ACK positions for the SPS PDSCH without physical downlink control channel (PDCCH) is determined based on the number of CBGs for the SPS PDSCH, and the number of HARQ-ACK positions for the SPS PDSCH with the PDCCH is determined based on the number of CBGs for the DG PDSCH.

In some embodiments, the HARQ-ACK codebook comprises a HARQ-ACK position for PDCCH activating the SPS PDSCH; the number of HARQ-ACK positions for the SPS PDSCH with the PDCCH is determined based on a decoding result of the PDCCH and the number of CBGs for the DG PDSCH; and the number of HARQ-ACK positions for the SPS PDSCH without PDCCH is determined based on the number of CBGs for the SPS PDSCH.

In some embodiments, a terminal device comprises circuitry configured to receive, from a network device, control information indicating a pattern of a set of semi-persistent scheduling physical downlink shared channel (SPS PDSCH) occasions for data transmission per periodicity of a transmission configuration; in accordance with a determination that the data transmission is received on the set of SPS PDSCH occasions, determine a control channel for transmitting hybrid automatic repeat request, HARQ, feedback information associated with the data transmission; and transmit the HARQ feedback information on the control channel to the network device.

In some embodiments, the terminal device comprises circuitry configured to receive the control information by one of: receiving the control information in a radio resource control (RRC) configuration; or receiving the control information in downlink control information (DCI).

In some embodiments, the pattern comprises one or more of: the number of the set of SPS PDSCH occasions; and a time domain location and/or a frequency domain location of the set of SPS PDSCH occasions.

In some embodiments, the terminal device comprises circuitry configured to receive the control information by receiving a RRC configuration comprising the control information which indicates a plurality of patterns of the set of SPS PDSCH occasions, and wherein In some embodiments, the terminal device comprises circuitry configured to receive, from the network device, DCI comprising an indication of a target pattern; and determine the target pattern from the plurality of patterns based on the indication.

In some embodiments, the terminal device comprises circuitry configured to receive the control information by receiving, from the network device, DCI comprising an indication of row index from a time domain resource allocation set; and determining the pattern of the set of SPS PDSCH occasion based on start and length indicator values (SLIVs) associated with the row index.

In some embodiments, the terminal device comprises circuitry configured to receive, from the network device, DCI comprising an indication of component carrier (CC) index for each SPS PDSCH occasion; and determine the pattern of the set of SPS PDSCH occasions based on the CC index indication.

In some embodiments, the terminal device comprises circuitry configured to in accordance with a determination that slot aggregation is configured for the data transmission, determine a transmission pattern for the data transmission on the set of SPS PDSCH occasions within a periodicity.

In some embodiments, the terminal device comprises circuitry configured to determine the control channel by: determining the control channel based on a last transmission occasion, wherein the last transmission occasion is one of: the last transmission occasion in the periodicity regardless of whether the nominal last transmission occasion collides with an uplink symbol, an actual last transmission occasion which does not collide with the uplink symbol, a last transmission occasion in time domain on lowest or highest CC index, a last transmission occasion in time domain among the set of transmission occasions on a plurality of CCs.

In some embodiments, the terminal device comprises circuitry configured to in accordance with a determination that HARQ-ACK for the data transmissions on the set of SPS PDSCH occasions is multiplexed with HARQ-ACK for at least a dynamic scheduled data transmission on the control channel, construct a Type-2 HARQ-ACK codebook comprising the HARQ-ACK for the SPS PDSCH transmissions and the HARQ-ACK for the dynamic scheduled PDSCH transmissions.

In some embodiments, the HARQ-ACK codebook comprises a first sub-codebook for single PDSCH transmission scheduling and a second sub-codebook for multiple PDSCH transmissions scheduling, and wherein the M is the number of the set of SPS PDSCH transmission occasions in a periodicity; and wherein the HARQ-ACK for the first M SPS PDSCH transmission occasions with corresponding activation DCI is placed in the second sub-codebook based on the DAI values carried in the activation DCI; and wherein the HARQ-ACK for the M SPS PDSCH transmission occasions without corresponding activation DCI is placed in the end of the first sub-codebook or the second sub-codebook.

In some embodiments, the HARQ-ACK codebook comprises HARQ-ACK positions for only single PDSCH transmission scheduling and HARQ-ACK positions for at least a set of SPS PDSCH transmissions, and wherein the M is the number of the set of SPS PDSCH transmission occasions in a periodicity; and wherein the bundling the HARQ-ACK bits for the first M SPS PDSCH transmission occasions with corresponding activation DCI as one HARQ-ACK bit, the terminal device comprises the circuitry configured to determine the HARQ position in the codebook for the one HARQ-ACK bit based on the DAI values carried in the activation DCI; and wherein the HARQ-ACK bits for the M SPS PDSCH transmission occasions without corresponding activation DCI are placed in the end of HARQ-ACK bits for the dynamic scheduled PDSCH transmissions.

In some embodiments, the HARQ-ACK codebook comprises HARQ-ACK positions for only single PDSCH transmission scheduling and a HARQ-ACK position of PDCCH which activates the SPS configuration, wherein the M is the number of the set of SPS PDSCH transmission occasions in a periodicity; and the terminal device comprises the circuitry configured to generate one HARQ-ACK bit for the PDCCH for activation DCI and determining the HARQ-ACK position of the one HARQ-ACK bit in the codebook based the DAI values carried in the activation DCI; and in accordance with a determination that the PDCCH is successfully decoded, the terminal device comprises the circuitry configured to generate HARQ-ACK for the first M SPS PDSCH transmission occasions with corresponding activation DCI, wherein the HARQ-ACK bits for the M SPS PDSCH transmission occasions are placed in the end of HARQ-ACK bits for the dynamic scheduled PDSCH transmissions.

In some embodiments, a terminal device comprises circuitry configured to receive from a network device, control information indicating a number of code block groups (CBGs) for a semi-persistent scheduling data channel per periodicity of a semi-persistent scheduling configuration.

In some embodiments, the terminal device comprises circuitry configured to receive the control information by: receiving the control information in a radio resource control (RRC) configuration, and wherein the number of CBGs are common for the semi-persistent scheduling data channel and a dynamic scheduling data channel; or the number of CBGs are configured per semi-persistent scheduling data channel for all semi-persistent scheduling configurations; or the number of CBGs are configured per semi-persistent scheduling data channel for each semi-persistent scheduling configuration.

In some embodiments, the terminal device comprises circuitry configured to receive the control information by:

receiving the control information in downlink control information (DCI) which comprises a field indicating information associated with the number of CBGs.

In some embodiments, the semi-persistent scheduling data channel is a semi-persistent scheduling physical downlink shared channel (SPS PDSCH), and wherein the terminal device comprises circuitry configured to: in accordance with a determination that HARQ-ACK for the SPS PDSCH is multiplexed with HARQ-ACK for dynamic granted PDSCH (DG PDSCH), construct a HARQ-ACK codebook comprising HARQ-ACK positions for the SPS PDSCH and DG PDSCH.

In some embodiments, the number of HARQ-ACK positions in a CC configured with CBG based transmission is determined based on a larger one between the number of CBGs for the SPS PDSCH and the number of CBGs for the DG PDSCH.

In some embodiments, the number of HARQ-ACK positions for the SPS PDSCH without physical downlink control channel (PDCCH) is determined based on the number of CBGs for the SPS PDSCH, and wherein the number of HARQ-ACK positions for the SPS PDSCH with the PDCCH is determined based on the number of CBGs for the DG PDSCH.

In some embodiments, the HARQ-ACK codebook comprises a HARQ-ACK position for PDCCH activating the SPS PDSCH; wherein the number of HARQ-ACK positions for the SPS PDSCH with the PDCCH is determined based on a decoding result of the PDCCH and the number of CBGs for the DG PDSCH; and wherein the number of HARQ-ACK positions for the SPS PDSCH without PDCCH is determined based on the number of CBGs for the SPS PDSCH.

Figure 15:
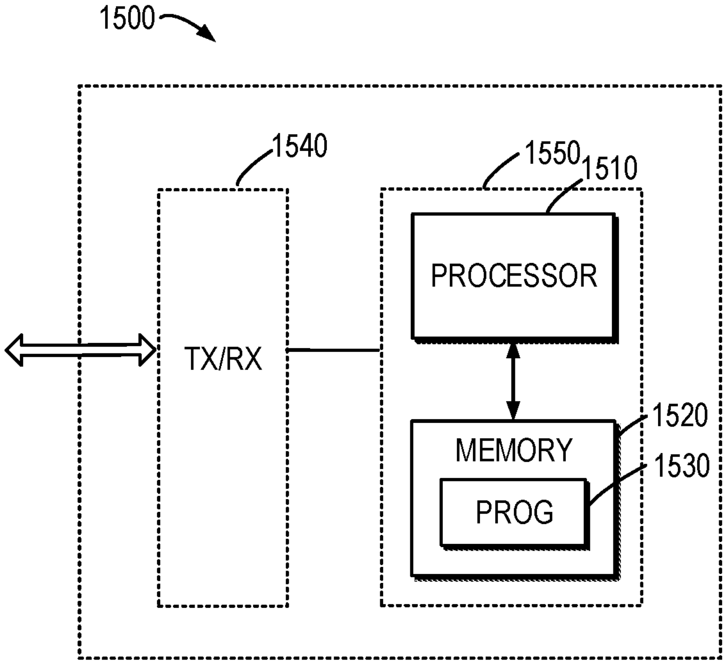
FIG. 15 is a simplified block diagram of a device that is suitable for implementing embodiments of the present disclosure.

FIG. 15 is a simplified block diagram of a device 1500 that is suitable for implementing embodiments of the present disclosure. The device 1500 can be considered as a further example implementation of the terminal device 110 and the network device 120 as shown in FIG. 1. Accordingly, the device 1000 can be implemented at or as at least a part of the terminal device 110 or the network device 120.

As shown, the device 1500 includes a processor 1510, a memory 1520 coupled to the processor 1510, a suitable transmitter (TX) and receiver (RX) 1540 coupled to the processor 1510, and a communication interface coupled to the TX/RX 1540. The memory 1520 stores at least a part of a program 1530. The TX/RX 1540 is for bidirectional communications. The TX/RX 1540 has at least one antenna to facilitate communication, though in practice an Access Node mentioned in this application may have several ones.

The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1530 is assumed to include program instructions that, when executed by the associated processor 1510, enable the device 1500 to operate in accordance with the embodiments of the present disclosure, as discussed herein with reference to FIG. 2 to 14. The embodiments herein may be implemented by computer software executable by the processor 1510 of the device 1500, or by hardware, or by a combination of software and hardware. The processor 1510 may be configured to implement various embodiments of the present disclosure. Furthermore, a combination of the processor 1510 and memory 1520 may form processing means 1550 adapted to implement various embodiments of the present disclosure.

The memory 1520 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1520 is shown in the device 1500, there may be several physically distinct memory modules in the device 1500. The processor 1510 may be of any type suitable to the local technical network, and may include one or more of general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 4-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A communication method performed by a terminal device, comprising:

receiving, from a network device, control information indicating a number of code block groups (CBGs) for a semi-persistent scheduling physical downlink shared channel (SPS PDSCH) per periodicity of a semi-persistent scheduling configuration; and constructing a hybrid automatic repeat request acknowledgement (HARQ-ACK) codebook comprising HARQ-ACK positions for the SPS PDSCH and dynamic scheduled PDSCH (DG PDSCH) in a case where HARQ-ACK for the SPS PDSCH is multiplexed with HARQ-ACK for the DG PDSCH, wherein the number of HARQ-ACK positions in a component carrier (CC) configured with CBG based transmission is determined based on a larger one between the number of CBGs for the SPS PDSCH and the number of CBGs for the DG PDSCH.

2. The method of claim 1, wherein receiving the control information comprises:

receiving the control information in a radio resource control (RRC) configuration, and wherein the number of CBGs are common for the SPS PDSCH and a dynamic scheduling data channel; or the number of CBGs are configured per SPS_PDSCH for all semi-persistent scheduling configurations; or the number of CBGs are configured per SPS_PDSCH for each semi-persistent scheduling configuration.

3. The method of claim 1, wherein receiving the control information comprises:

receiving the control information in downlink control information (DCI) which comprises a field indicating information associated with the number of CBGs.

4. The method of claim 1, wherein the number of HARQ-ACK positions for the SPS PDSCH without physical downlink control channel (PDCCH) is determined based on the number of CBGs for the SPS PDSCH, and wherein the number of HARQ-ACK positions for the SPS PDSCH with the PDCCH is determined based on the number of CBGs for the DG PDSCH.

5. The method of claim 1, wherein the HARQ-ACK codebook comprises a HARQ-ACK position for PDCCH activating the SPS PDSCH;

wherein the number of HARQ-ACK positions for the SPS PDSCH with the PDCCH is determined based on a decoding result of the PDCCH and the number of CBGs for the SPS PDSCH; and wherein the number of HARQ-ACK positions for the SPS PDSCH without PDCCH is determined based on the number of CBGs for the SPS PDSCH.

6. A communication method performed by a network device, comprising:

transmitting, to a terminal device, control information indicating a number of code block groups (CBGs) for a semi-persistent scheduling physical downlink shared channel (SPS PDSCH) per periodicity of a semi-persistent scheduling configuration; and receiving, from the terminal device, a hybrid automatic repeat request acknowledgement (HARQ-ACK) codebook comprising HARQ-ACK positions for the SPS PDSCH and dynamic scheduled PDSCH (DG PDSCH), the number of HARQ-ACK positions in a component carrier (CC) configured with CBG based transmission is determined based on a larger one between the number of CBGs for the SPS PDSCH and the number of CBGs for the DG PDSCH.

7. The method of claim 6, wherein transmitting the control information comprises:

transmitting the control information in a radio resource control (RRC) configuration, and wherein the number of CBGs are common for the SPS PDSCH and a dynamic scheduling data channel; or the number of CBGs are configured per SPS PDSCH for all semi-persistent scheduling configurations; or the number of CBGs are configured per SPS PDSCH for each semi-persistent scheduling configuration.

8. The method of claim 6, wherein transmitting the control information comprises:

transmitting the control information in downlink control information (DCI) which comprises a field indicating information associated with the number of CBGs.

9. The method of claim 6, wherein the number of HARQ-ACK positions for the SPS PDSCH without physical downlink control channel (PDCCH) is determined based on the number of CBGs for the SPS PDSCH, and wherein the number of HARQ-ACK positions for the SPS PDSCH with the PDCCH is determined based on the number of CBGs for the DG PDSCH.

10. The method of claim 6, wherein the HARQ-ACK codebook comprises a HARQ-ACK position for PDCCH activating the SPS PDSCH;

wherein the number of HARQ-ACK positions for the SPS PDSCH with the PDCCH is determined based on a decoding result of the PDCCH and the number of CBGs for the SPS PDSCH; and wherein the number of HARQ-ACK positions for the SPS PDSCH without PDCCH is determined based on the number of CBGs for the SPS PDSCH.

11. A terminal device comprising:

a processor configured to cause the terminal device to:

receive, from a network device, control information indicating a number of code block groups (CBGs) for a semi-persistent scheduling physical downlink shared channel (SPS PDSCH) per periodicity of a semi-persistent scheduling configuration; and construct a hybrid automatic repeat request acknowledgement (HARQ-ACK) codebook comprising HARQ-ACK positions for the SPS PDSCH and dynamic scheduled PDSCH (DG PDSCH) in a case where HARQ-ACK for the SPS PDSCH is multiplexed with HARQ-ACK for the DG PDSCH, wherein the number of HARQ-ACK positions in a component carrier (CC) configured with CBG based transmission is determined based on a larger one between the number of CBGs for the SPS PDSCH and the number of CBGs for the DG PDSCH.

12. The terminal device claim 11, wherein receiving the control information comprises:

receiving the control information in a radio resource control (RRC) configuration, and wherein the number of CBGs are common for the SPS PDSCH and a dynamic scheduling data channel; or the number of CBGs are configured per SPS PDSCH for all semi-persistent scheduling configurations; or the number of CBGs are configured per SPS PDSCH for each semi-persistent scheduling configuration.

13. The terminal device claim 11, wherein receiving the control information comprises:

receiving the control information in downlink control information (DCI) which comprises a field indicating information associated with the number of CBGs.

14. The terminal device claim 11, wherein the number of HARQ-ACK positions for the SPS PDSCH without physical downlink control channel (PDCCH) is determined based on the number of CBGs for the SPS PDSCH, and wherein the number of HARQ-ACK positions for the SPS PDSCH with the PDCCH is determined based on the number of CBGs for the DG PDSCH.

* * * * *